(12) United States Patent
Yoshida et al.

(10) Patent No.: US 6,652,376 B1
(45) Date of Patent: Nov. 25, 2003

(54) DRIVING GAME WITH ASSIST AND TRAINING MODES

(75) Inventors: Shigeru Yoshida, Tokyo (JP); Takuji Masuda, Tokyo (JP); Takanori Kobayashi, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/504,387

(22) Filed: Feb. 15, 2000

(30) Foreign Application Priority Data

Feb. 15, 1999 (JP) .......................... 11-035636

(51) Int. Cl.[7] ................................ A63F 9/14
(52) U.S. Cl. .............. 463/6; 463/7; 463/23; 434/62; 434/65
(58) Field of Search ............... 463/7, 23, 6; 434/62–66

(56) References Cited

U.S. PATENT DOCUMENTS

| | | | | |
|---|---|---|---|---|
| 4,148,485 A | * | 4/1979 | Rains ........................... | 463/31 |
| 4,500,868 A | * | 2/1985 | Tokitsu et al. ............... | 180/282 |
| 4,750,888 A | * | 6/1988 | Allard et al. ................. | 463/69 |
| 5,286,099 A | * | 2/1994 | Fujita et al. ................. | 180/271 |
| 5,366,376 A | * | 11/1994 | Copperman et al. .... | 273/148 B |
| 5,683,082 A | * | 11/1997 | Takemoto et al. ........ | 273/121 B |
| 5,707,237 A | * | 1/1998 | Takemoto et al. .......... | 348/121 |
| 5,921,780 A | * | 7/1999 | Myers ........................ | 434/29 |
| 5,983,161 A | * | 11/1999 | Lemelson et al. ......... | 340/436 |
| 6,146,143 A | * | 11/2000 | Huston et al. .............. | 345/620 |
| 6,200,138 B1 | * | 3/2001 | Ando et al. ............. | 273/148 B |
| 6,241,524 B1 | * | 6/2001 | Aoshima et al. ............ | 434/118 |

* cited by examiner

Primary Examiner—Derris H. Banks
Assistant Examiner—Corbett B Coburn
(74) Attorney, Agent, or Firm—Finnegan, Henderson, Farabow, Garrett & Dunner, L.L.P.

(57) ABSTRACT

A driving game, wherein players having various driving skills—from beginners to those advanced—may enjoy both aspects of amusement and simulation in consistency. The game device of the present invention has an element for providing to a player a plurality of different movement modes upon moving the vehicle along a traveling line. Upon selection of a desired movement mode, a vehicle-driving game relating to the driving mode selected by the player is executed. Included in this plurality of driving modes are an assist mode in which auto-brake control is performed and a training mode in which various indications, such as the timing of the braking point, are given.

22 Claims, 27 Drawing Sheets

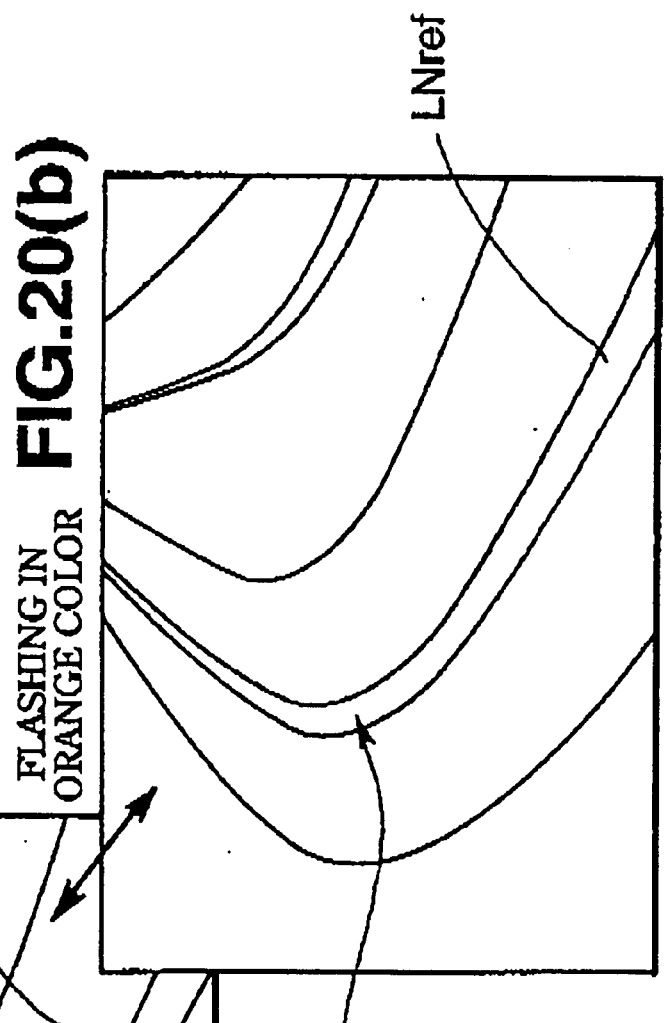
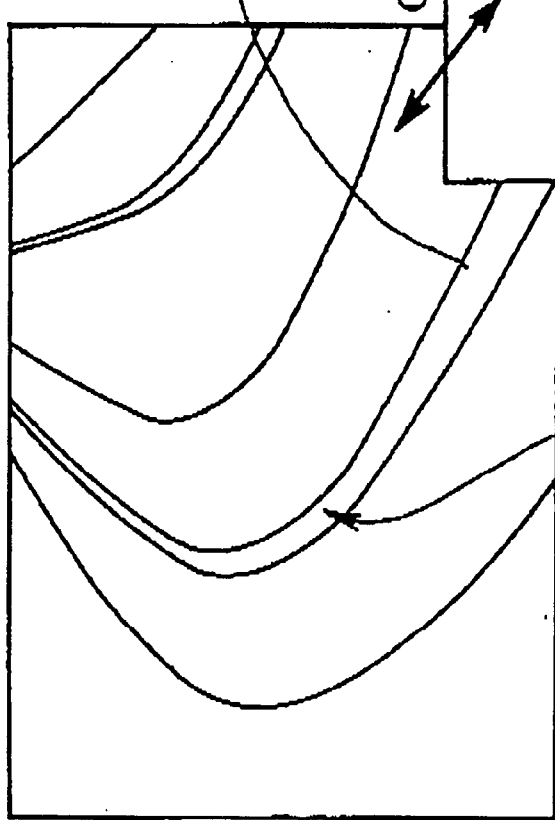

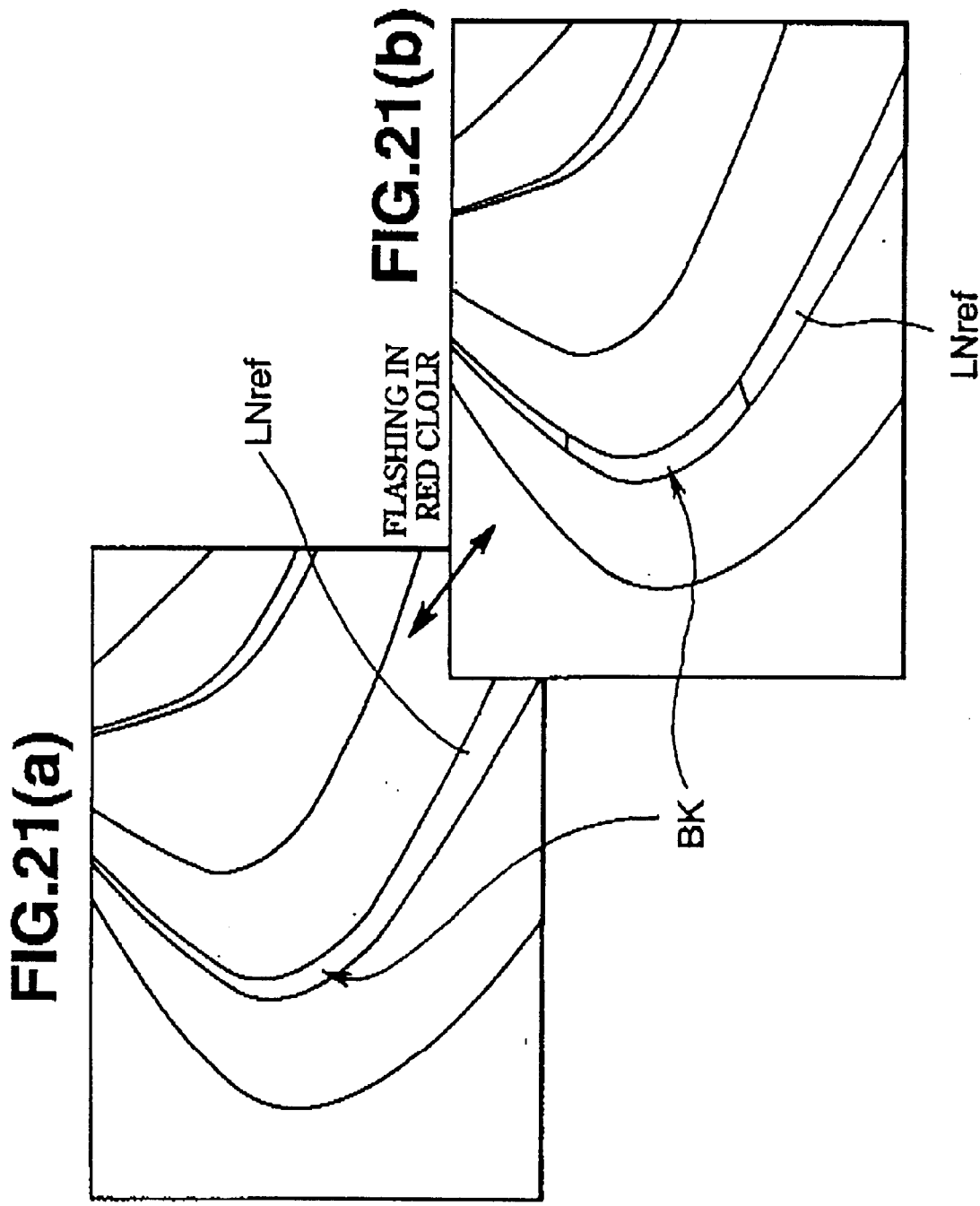

DRIVING GAME WITH ASSIST AND TRAINING MODES

BACKGROUND OF THE INVENTION

1. Field of the Invention

The present invention generally relates to a game device, and particularly relates to a game device for displaying images of the moving state of objects, such as automobiles, in a virtual three-dimensional space in response to operations of a player.

2. Description of the Related Art

Pursuant to recent developments in computer graphics technology, simulation devices and game devices have become widely popular for both business and domestic use. As an example of this type of device, there is a driving (car race) game wherein the players compete for fastest lap times by moving their cars as objects on the course set in a virtual three-dimensional space (game space). It has gained a well-established popularity.

Generally, the simulation device or the game device (hereinafter collectively referred to as the "game device") used for playing this game comprises a device main body with a built-in computer unit for executing a pre-stored game program, an operational unit for supplying to the computer unit operational signals ordering the movement of the object realized in the game, a display for displaying images pursuant to the game progress realized by the execution of the game program by the computer unit, and a sound device for generating sounds pursuant to the game development.

In this game device, the likes of a vehicle (object) with a driver representing the player are displayed on the display. The player operates the operational unit and provides the computer unit with information on the traveling route, traveling speed, and so on. The computer unit calculates the behavior of the vehicle in real time according to such operational information, obtains image data of the traveling state, and displays this image data on the display.

The driving mode of this game is as follows. Not only is the player's vehicle displayed as an image on the display, but the road signs and the like are also displayed together with the background. The player reads one's traveling state from the sharpness of a turn, contents of the road signs showing a curve ahead, movement of the surrounding scenery, etc., and controls the acceleration and deceleration via the operational units (accelerator pedal, brake pedal, gearshift, etc.).

Nevertheless, as there is only one driving mode in conventional driving games, the player merely judges one's traveling state upon viewing the displayed background, road signs, and so forth. Thus, although experienced players are able to achieve high scores in accordance with his/her degree of skill, beqinrters and players who are poor at driving are not able to achieve good scores, and there is a problem in that their interest in the game would languish.

Contrarily, although it would be possible to make the game content enjoyable even to beginners such as by lowering the degree of difficulty of the course (traveling route), for example, advanced and experienced players will not be able to enjoy a satisfactory drive. Therefore, there was a tendency to make the degree of difficulty of the game high, such as by setting the course accordingly. This, however, demanded a high degree of driving skill and led to a game in which a beginner could not easily play. Moreover, the game device would lack amusement merely with the difficulty of the driving technique, and consideration to this aspect is also necessary.

SUMMARY OF THE INVENTION

The present invention was devised in view of the aforementioned problems encountered by conventional technology, and an object thereof is to provide a game, such as a driving game, wherein the players having various driving skills—from beginners to those advanced—may enjoy both aspects of amusement and simulation in consistency.

In order to achieve the aforementioned object, the game device of the present invention is structured as follows.

In one invention, a game device for moving an object in virtual three-dimensional space pursuant to the operations from player and generating images of the moving state of such object, comprises: mode provision means for providing to a player a plurality of different movement modes upon moving the object; selection means for enabling a player to select a desired movement mode from such plurality of different movement modes; and game execution means for executing a game relating to the movement of the object in the movement mode selected by the player.

According to this structure, for example, the object is a vehicle to be moved along a traveling line provided in the virtual three-dimensional space; and the mode provision means provides to a player a plurality of driving modes of the vehicle as the plurality of movement modes. Furthermore, the plurality of driving modes includes an assist mode having an auto-brake function for automatically assisting the braking power of the vehicle. According to one preferable example, the plurality of driving modes includes a training mode having an indication function for indicating the driving state upon the player virtually driving the vehicle. In addition, preferably, the indication function indicates to the player the driving state with, at the least, either an image or a sound. It is further desirable that the indication function is composed of at least one of the following: a first indication function for indicating to the player a reference travel line by displaying this on the traveling line; a second indication function for indicating to the player the brake timing by altering the display mode of the reference travel line; a third indication function for indicating to the player the existence of a curve on the traveling line; and a fourth indication function for indicating to the player the gearshift position at the curves on the traveling line.

Here, for example, the game execution means executes the game by exhibiting at least one function among the first through fourth indication functions by referring to an ideal reference data including speed data and brake data per each block along the traveling line obtained based on the driving result of an experienced player. Preferably, the game execution means exhibits the second indication function by including: means for comparing the speed data of the reference data and the speed of the vehicle driven by the player and, when the comparative result shows that the speed data is greater than the vehicle speed, altering the brake data of the blocks ahead of the vehicle to be zero until the vehicle speed exceeds the speed data; and means for altering the display mode of the traveling line pursuant to the alteration result of this block data.

In another invention, a game device for moving an object in a virtual three-dimensional space pursuant to operations from the player and generating images of the moving state of such object, comprises: storage means for pre-storing reference data representing the movement of the object in an ideal state; operation means for operating the actual data showing the moving state upon the player actually moving the object; and assist means for comparing the reference data and actual data and automatically assisting the moving state of the object to be moved by the player.

As a preferable example according to this structure, the object is a vehicle to be moved along the traveling line provided within the virtual three-dimensional space; and the movement of the object is represented by the object traveling along the traveling line of the vehicle. For example, the reference data is driving data prepared from the driving state obtained from the driving of a driver, who is well-experienced with driving an actual vehicle in an actual space, along a traveling route; and the traveling line in the virtual three-dimensional space is the line simulating the traveling route in such actual space. As one example thereof, the driving data includes speed data, brake data and travel line data based on the driving of the experienced player prepared along the traveling line and per block of a prescribed length. Here, the assist means compares the reference data and actual data and automatically assists the braking state of the vehicle to be moved by the player.

According to a preferable, specific structure, the assist means includes means for obtaining the target acceleration from the speed data of the reference data of a block in front of the block on which the vehicle is positioned, and the speed of the vehicle driven by the player; means for estimating the vehicle acceleration from the operational state of the player; means for comparing and judging the target acceleration and the estimate acceleration; means for judging the application of a brake when this comparative result shows that the target acceleration is greater than the estimate acceleration; and means for automatically assisting the control of the degree of acceleration when the judgment means judges that the application of the brake is not necessary, and assisting the control of the degree of acceleration and the amount of brake application when the judgment means judges that the application of the brake is necessary.

According to still another invention, a game device for moving an object in a virtual three-dimensional space pursuant to operations from a player and generating images of the moving state of such object, comprises: operation means for performing modeling conversion on traces pursuant to the movement of the object from a camera viewpoint and operating the conversion matrix thereof; storage means for storing such conversion matrix; judgment means for judging whether the display of traces is necessary; and display means for reading the conversion matrix from the storage means and displaying the conversion matrix when the judgment means judges that the display of traces is necessary.

According to a further invention, a game device for moving an object in a virtual three-dimensional space pursuant to operations from an operator and generating images of the moving state of such object, comprises: movement mode provision mean for providing a plurality of movement modes including a brake timing notification mode for notifying the operator of the brake application timing of the object; and selection means for selecting the movement mode pursuant to the selection made by the operator; wherein the movement mode provision means for realizing the brake timing notification mode includes: judgment means for judging whether or not brake application is necessary based on the speed and position of the object operated by the operator; calculation means for calculating the brake timing based on the speed and position of the object operated by the operator when the judgment means judges that brake application is necessary; and notification means for notifying the operator of the brake application timing based on the brake timing calculated by the calculation means.

Here, for example, the judgment means and calculation means respectively perform judgment and calculation based on the speed and position of the object operated by the operator, and the reference data corresponding to such position. In addition, the notification means notifies, earlier than usual, the brake application timing when the speed of the object is fast in comparison to when the speed of the object is slow.

According to a still further invention, a vehicle brake-control device for controlling the braking power of the vehicle traveling along the route in an actual space, comprises: storage means for pre-storing data relating to braking of the traveling route where the vehicle is to travel; vehicle position detection means for detecting the position of the vehicle on the traveling route; and control means for automatically controlling the braking state of the vehicle during the traveling state thereof based on the data stored in the storage means and the position detected by the vehicle position detection means.

BRIEF DESCRIPTION OF THE DRAWINGS

FIG. 20 is an example of a display screen indicating the braking point;

FIG. 21 is an example of a display screen indicating the braking point;

DESCRIPTION OF THE PREFERRED EMBODIMENTS

Embodiments of the present invention are now explained with reference to the attached drawings.

First Embodiment

The first embodiment of the present invention is explained below with reference to FIGS. 1 to 23.

The game device according to this embodiment provides a driving game wherein players drive around a circuit course (traveling line) and compete for best lap times.

Figure 1:
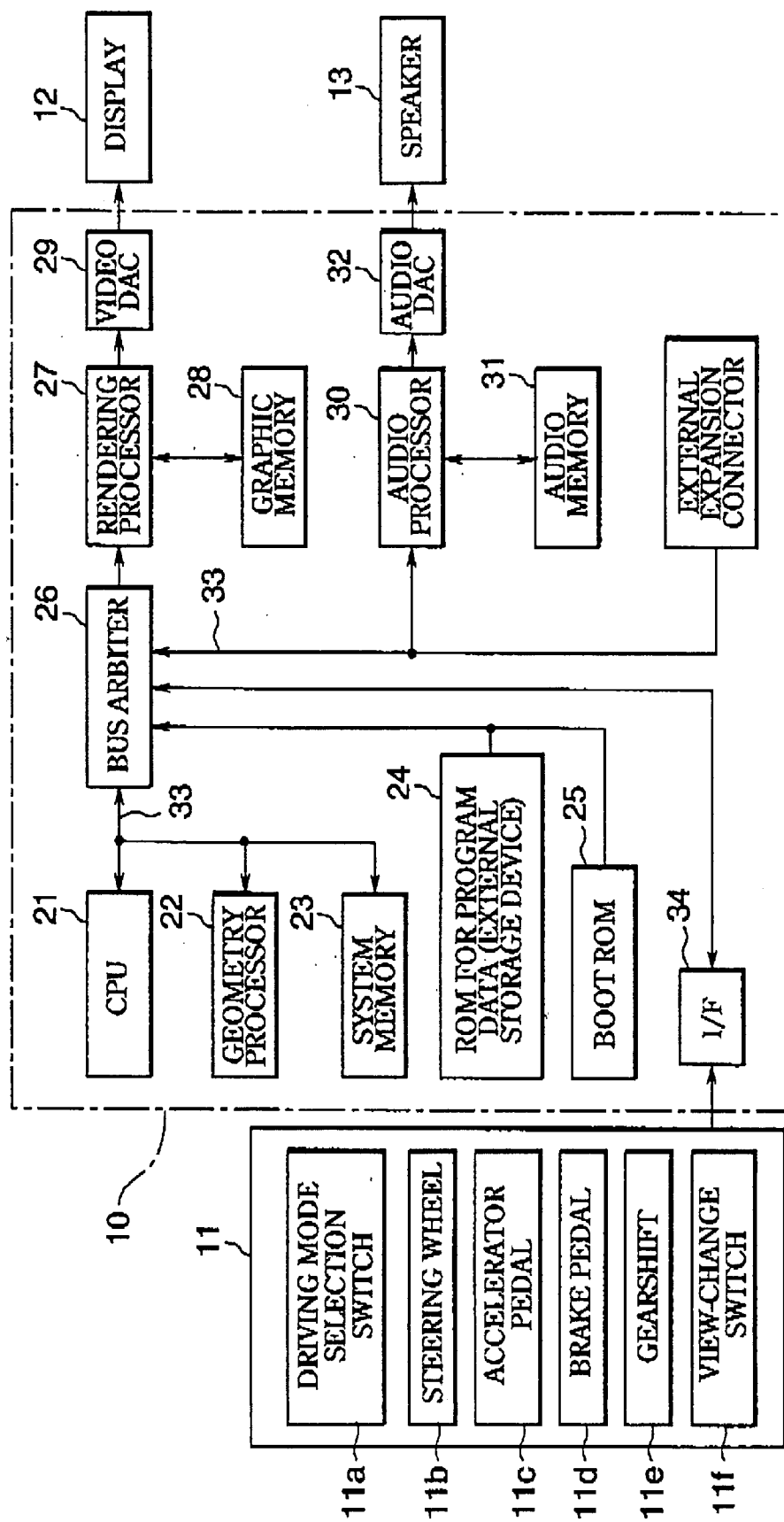
FIG. 1 is a block diagram of the game device according to an embodiment of the present invention.

FIG. 1 is an electrical block diagram showing the outline of the game device. As shown in FIG. 1, the game device comprises a game processing board 10. Electrically connected to this game processing board 10 are devices such as an operational unit 11, display 12, speaker 13, external expansion connector 14, and so on. The player, while viewing the game screen displayed on the display 12, may play the driving game by operating the various devices of the operational unit 11.

Other than the counter not shown, the game processing board 10 comprises a CPU (central processing unit) 21, geometry processor 22, system memory 23, ROM 24 for program data, boot ROM 25, bus arbiter 26 for a bus controller, rendering processor 27, graphic memory 28, video DAC 29, audio processor 30, audio memory 31, audio DAC 32, and partial elements thereof are, mutually connected via a bus line 33.

Among the above, the CPU 21 is connected to the geometry processor 22 and the system memory 23 via the bus line 33, the first system thereof is connected to the ROM 24 for program data and the boot ROM 25 via the bus arbiter 26 and bus line 33, the second system thereof is connected to the operational unit 11 via an I/0 34, the third system thereof is connected to the external expansion connector 14, the third system thereof is connected to the audio processor 30, and the fourth system thereof is connected to the rendering processor 27, respectively. The rendering processor 27 is connected to the graphic memory 28 and the video DAC 29. The audio processor 30 is connected to the audio memory 31 and the audio DAC 32.

The system memory 23 pre-stores prescribed programs and image processing programs of this device. The boot ROM 25 pre-stores a program for booting the system.

After the power is turned on, the CPU 21 activates the system by reading the boot program stored in the boot ROM 25, and thereafter executes processes relating to various operations and controls based on the internal program of the system memory ROM 23. This includes a process for selecting a desired driving mode among the plurality of preset driving modes, a process peculiar to each of the various driving modes, a behavior calculation (simulation) process of the vehicles, and a calculation process of the special effects.

Behavior calculation simulates the movement of the vehicles in a virtual three-dimensional space (game space). In order to execute such calculation, after the polygon coordinate values of the vehicle in the virtual three-dimensional space are determined, the conversion matrix and shape data (polygon data) for converting such coordinate values into a two-dimensional visual field coordinate system are designated by the geometry processor 22. Here, polygon data shall mean the coordinate data group of the relative or absolute coordinates of the respective apexes of a polygon (polygonal shape: mainly triangles and quadrilaterals) composed of an aggregate of a plurality of apexes.

The ROM 24 for program data pre-stores shape data (three-dimensional data of characters, landforms, backgrounds, etc., formed of the respective apexes) composed of a plurality of polygons. This shape data is delivered to the geometry processor 22. The geometry processor 22 performs perspective conversion on the designated shape data with the conversion matrix sent from the CPU 21, and obtains shape data converted from the coordinate system in the three-dimensional space to the visual field coordinate system. This shape data is sent to the rendering processor 27.

The rendering processor 27 reads texture data from the, graphic memory 28, affixes this texture to the shape data of the converted visual field coordinate system, and outputs this to the internal frame buffer of the video DAC 29. Polygon screens (simulation results) such as vehicles and landforms (backgrounds) temporarily stored in the frame buffer and scroll screens such as character information are synthesized pursuant to a designated priority, and a final frame image data is generated per fixed timing. This frame image data is D/A converted and sent to the display 12, thereby being displayed as a game screen in real time.

The audio processor 30 generates sound data based on orders from the CPU 21 and outputs this data to the speaker 13 via the audio DAC 32. Sound data is thereby power amplified and output from the speaker 13 as sound.

The operational unit 11 is equipped with a driving mode selection switch 11a, steering wheel 11b, accelerator pedal 11c, brake pedal 11d, gearshift 11e, view-change switch 11f and so on to be operated by the player. The player is thereby able to view the display screen of the display 12 and provide the CPU 21, via the I/F 34, with driving information relating to driving mode selection, steering angle, acceleration, deceleration, gearshift position, viewpoint position of the camera placed in the virtual three-dimensional space, and so on.

Next, the image generation processing of the driving game, realized by the game device according to the present embodiment is described below. The CPU 21 executes a prescribed main program by default after the game device is activated, and during the execution process thereof, further executes the timer interrupt processing shown in FIGS. 2 and 3.

[Driving Mode Selection Processing]

Figure 2:
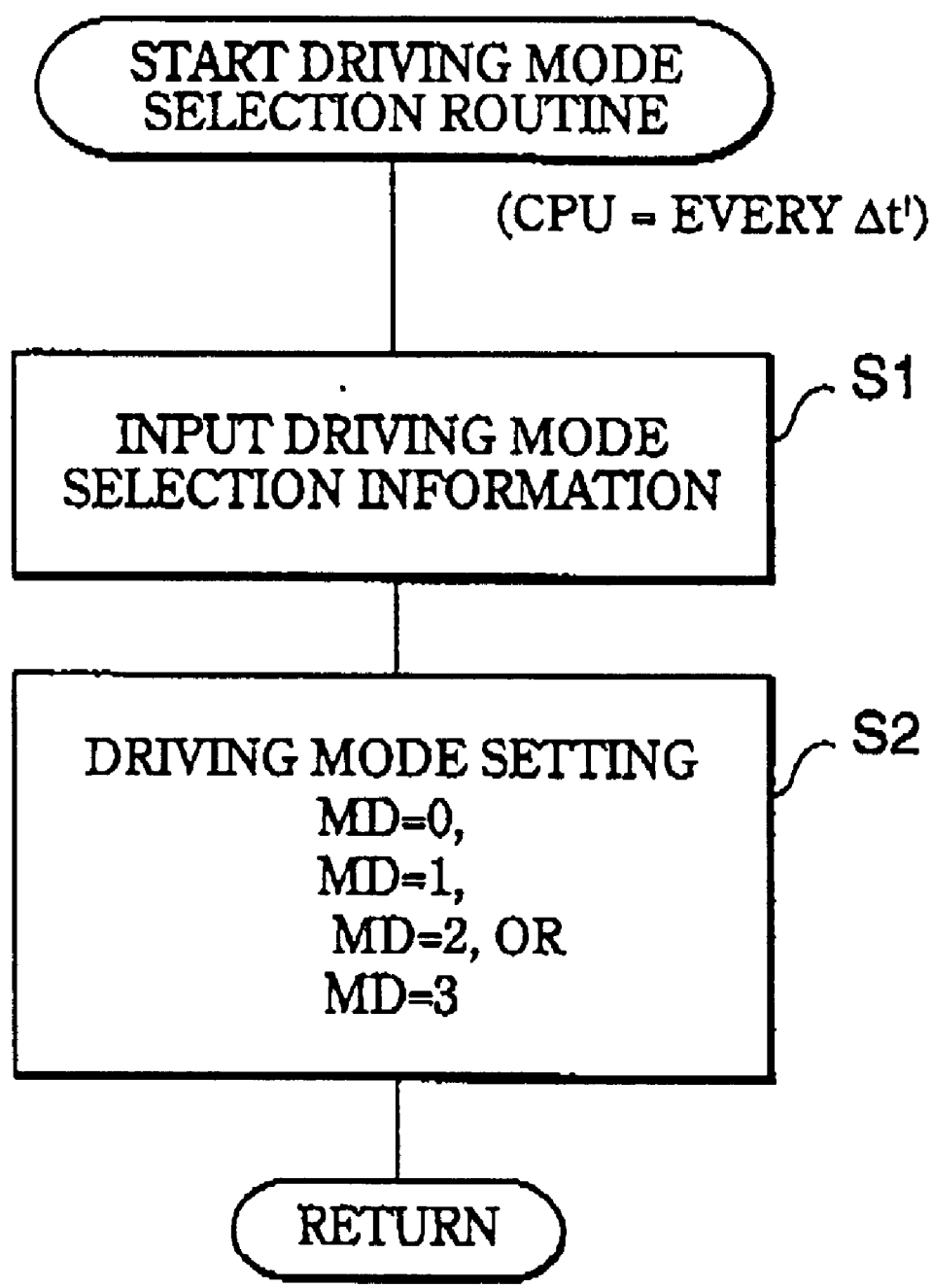
FIG. 2 is a flowchart showing the outline of the selection processing of the driving mode in the first embodiment.

The processing shown in FIG. 2 is a processing routine, which is executed per fixed time Δt' by the CPU 21, which allows a player to select a driving mode of a vehicle (player car) from a plurality of driving modes prepared in advance.

This fixed time Δt' does not necessarily have to be the same as the interrupt time Δt to the processing shown in FIG. 3 described later.

The CPU 21 reads the switch information of the driving mode selection switch 11a as the driving mode selection information (FIG. 2; step S1), and sets one driving mode among the four types of driving modes in correspondence with such information (step S2).

Four types of modes are prepared for the present embodiment as the driving modes; namely, an assist mode, a semi-assist mode, a training mode, and a simulation mode. These four types of modes have the same traveling line on which the vehicle is to travel, but they mutually have different driving characteristics (i.e., ease of driving operation attributable to the physical motion relationship between the traveling line and the vehicle) for the player to drive the virtual vehicle. Each of the driving characteristics are differentiated and made unique by adjusting the degree of incorporation of the control factors (ABS, TRC, auto-brake control, etc.) that influence the driving characteristics of the vehicle.

The assist mode is a mode for beginners, and assists the driving of a beginner player based on reference data $DATA_{ref}$ showing the driving state (granted this is an ideal state) of an experienced player adopted as the ideal driving state. Such assistance, in principle, includes controlling the throttle of the accelerator 11c and the application of the brake 11d (hereinafter referred to as "auto-brake control" as necessary) for automatically assisting the braking of the vehicle. In this assist mode, the likes of ABS (anti-skid) control and TRC (traction control) are also executed as one of the vehicle behavior calculations and, as a result, the driving characteristics thereof are also automatically controlled to be easy for the beginners.

The semi-assist mode is preferable for beginners having some experience in driving, and is a mode wherein the function of auto-brake control is removed from the aforementioned assist mode. As the auto-brake control is removed from the driving characteristics, the driver's skill is more easily reflected on the driving state.

As with the aforementioned assist mode, the training mode, achieves the gist of the present invention and is also a preferable driving mode for beginners. This mode is especially suitable for players playing the game for the first time or players inexperienced with driving games, and gives indications (advice) of important points of the driving operation with sound and/or display during the game based on data (reference data $DATA_{ref}$) relating to the driving of an experienced player. The driving characteristics of this mode are the same as the semi-assist mode, but due to the indications for the driving operation given to the players, the players would usually receive an impression that driving in the training mode is easier than in the semi-assist mode.

The simulation mode is preferable for advanced or experienced players, and does not carry any function of automatically assisting the driving state of the player by the device side or any function of giving indications for the driving operation by the device side. This mode simulates the player's driving ability as is, and the driving characteristics thereof are also set to be the most difficult.

Accordingly, the CPU 21 sets the variable MD to be 0, the selected state, when the assist mode is selected as the driving mode by the player, sets the variable MD to be 1 when the semi-assist mode is selected, sets the variable MD to be 2 when the training mode is selected, and sets the variable, MD to be 3 when the simulation mode is selected (step S2).

As the aforementioned driving mode selection processing is executed per fixed time Δt', when the player selects a different driving mode, the main routine thereafter is processed with the renewed driving mode.

[Image Generation Processing]

Figure 3:
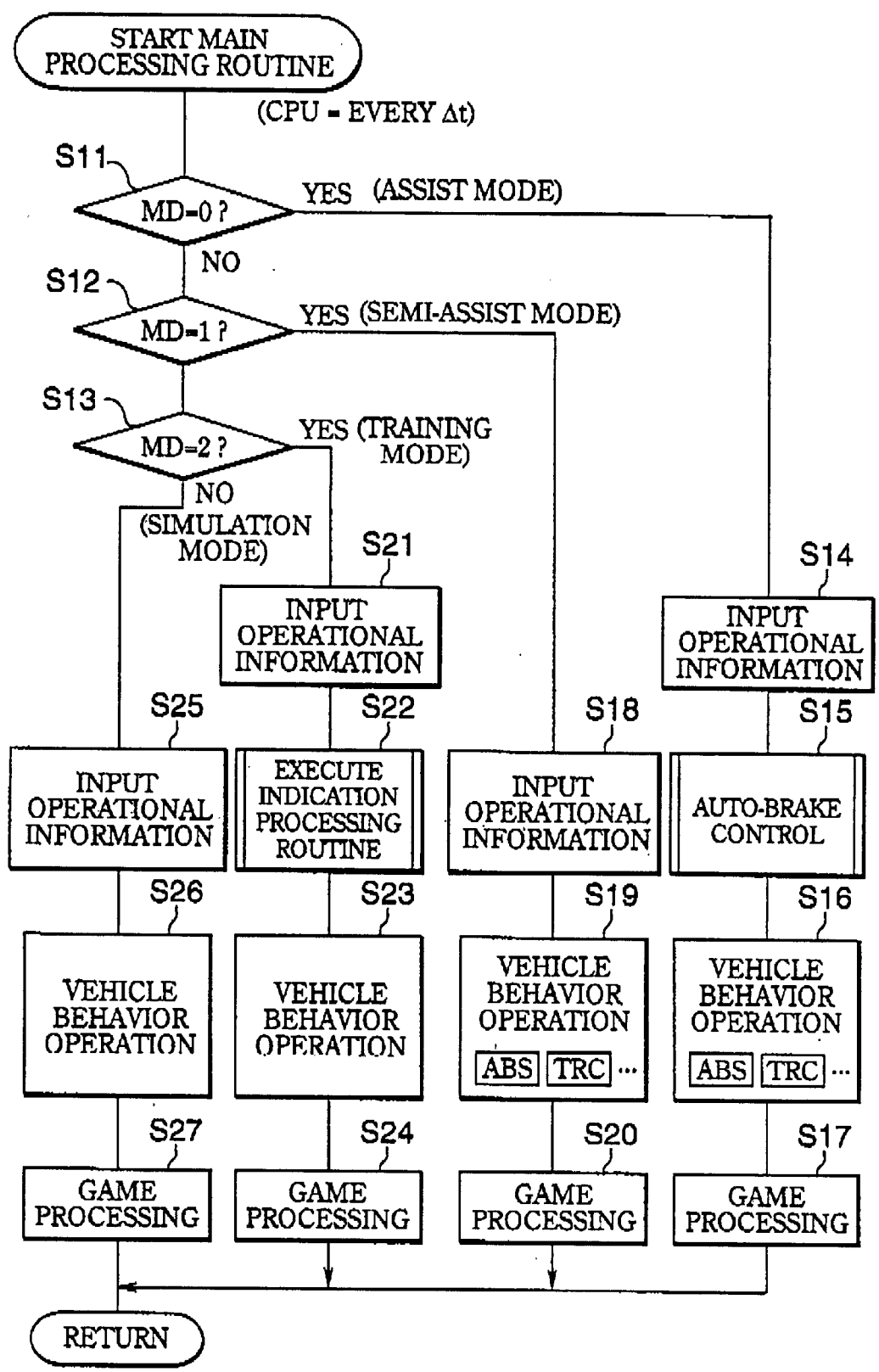
FIG. 3 is a flowchart showing the outline of the processing flow of another driving mode.

Meanwhile, FIG. 3 shows a main routine of the image generation processing. This main routine, for example, is repeatedly executed by the CPU 21 for every one field (Δt=1/60 sec) synchronized with the display interrupt.

Specifically, this routine judges the driving mode (steps S11 to S13) by checking the value of the variable MD currently set by the aforementioned driving mode selection processing (FIG. 2). As a result, when the variable MD is 0 and it is judged as the assist mode, the routine proceeds to processing steps S14 to S17. When the variable MD is 1 and it is judged as the semi-assist mode, the routine proceeds to processing steps S18 to S20. When the variable MD is 2 and it is judged as the training mode, the routine proceeds to processing steps S21 to S24. When the variable MD is 3 and it is judged as the simulation mode, the routine proceeds to processing steps S25 to S27.

Processing for the separate driving modes is now explained in further detail.

1. Assist Mode

Foremost, in the assist mode, information on the current operational state (steering angle, acceleration throttle, brake application, gearshift position) with respect to the steering wheel 11b, accelerator 11c, brake 11d and gearshift 11e of the operational unit 11 is read (step S14). Next, processing for the auto-brake control is performed (step S15).

Figure 4:
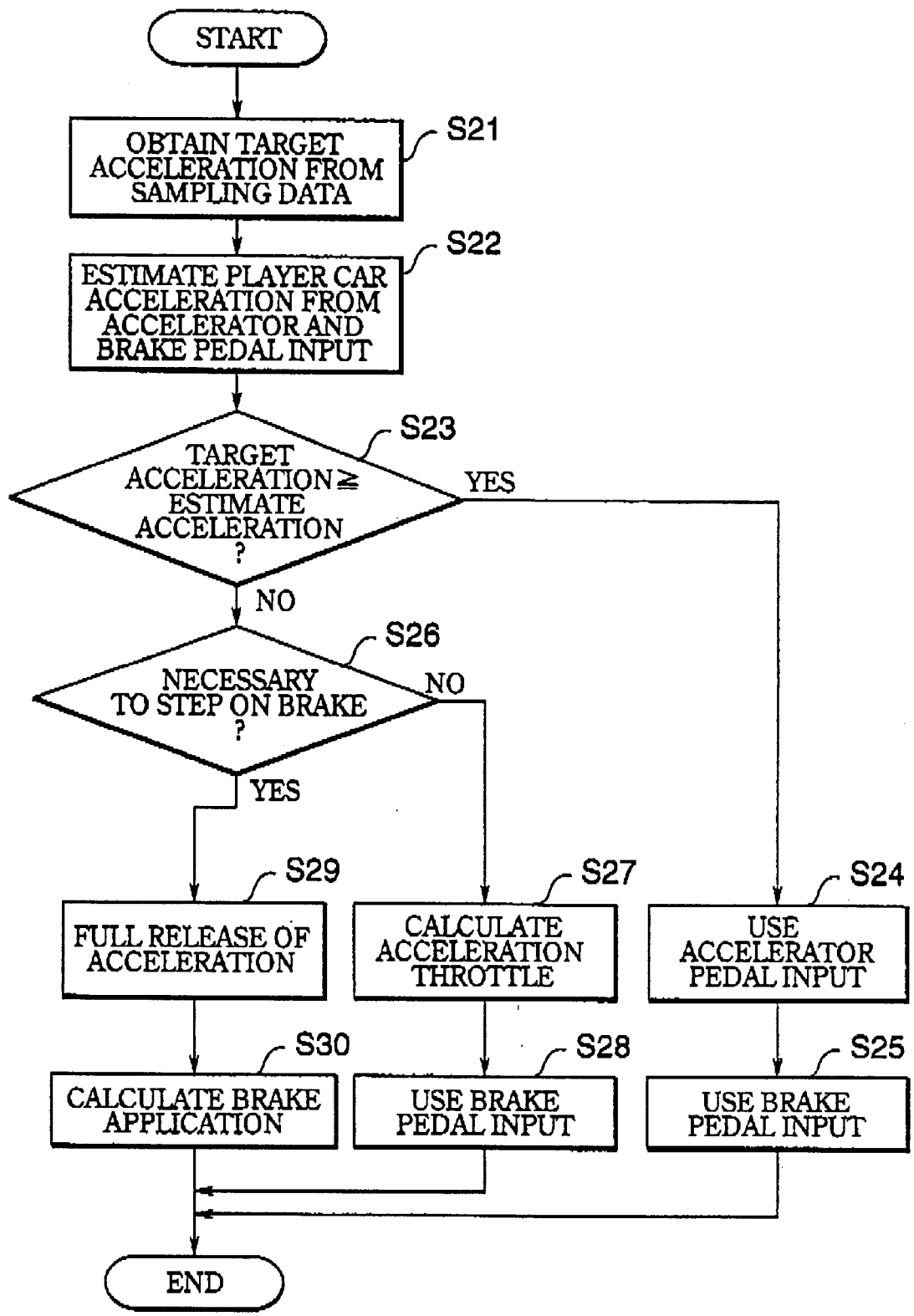
FIG. 4 is a flowchart showing the outline of the auto-brake control in the assist mode.

This processing for auto-brake control is executed as the subroutine shown in FIG. 4. The basis for activating/commencing the auto-brake function is predetermined. That is, driving data (i.e., data representing an ideal drive along the course in this game device, hereinafter referred to as "reference data $DATA_{ref}$") such as speed data, brake data (showing the degree of braking), and traveling line (position) during an ideal drive made by a player experienced (advanced) in the driving of the game is sampled, and this is pre-stored in the ROM 14 in the form of a data table. This reference data $DATA_{ref}$ is provided in sectional units (hereinafter referred to as "blocks") of the respective courses divided in prescribed intervals (e.g., 4 m to 8 m) (cf. FIG. 6(a) explained later).

Reference data $DATA_{ref}$ is prepared with a reference data preparation tool in advance. Although it is possible to prepare the entire reference data $DATA_{ref}$ by theoretical calculation, this is extremely time consuming and there is also a problem, in that the traveling line will lack reality if it were theoretically conceived and calculated. Thus, in the present embodiment, reference data $DATA_{ref}$ including speed data brake data, and traveling line of a drive actually made in a game by an experienced player, is saved in binary. The reference data $DATA_{ref}$ is then loaded with a reference data preparation tool and, by altering this data, the reference data $DATA_{ref}$ is thereby prepared.

Here, the CPU 21 operates the target acceleration currently required from the sampling data obtained by referring to the current vehicle speed and reference data $DATR_{ref}$ (step S21). Particularly, the target acceleration speed is operated utilizing reference speed data $SP_{ref}$, which is obtained by sampling reference data $DATA_{ref}$ of a block immediately ahead of the block on which the vehicle is currently positioned, the current vehicle speed V, and the distance to the next block ahead.

Next, the acceleration of the player-driven vehicle (player car) in the next block is estimated from the operational values of the accelerator 11c and the brake 11d read above (step S22). Thereafter, the CPU 21 judges whether or not the target acceleration is greater than or equal to the estimate acceleration (step S23).

When the comparative judgment result in this step S23 is YES (i.e., target acceleration is greater than or equal to the estimate acceleration), compulsory brake control is judged as being unnecessary, and the value of the player's operation is set as the control input of the brake 11d, as in (steps S24, S25). Thereby, the player's operation is reflected, as is, to the behavior calculation and game processing of the vehicle (player car) explained later.

Contrarily, when the comparison judgment result in step S23 is NO (i.e., target acceleration is less than the estimate acceleration), the necessity of further application of the brake 11d is judged by comparing the acceleration speed calculated based on the engine brake upon full release of the acceleration and the current application of the brake 11d, and the target acceleration (step S26).

When further application of the brake is determined to be unnecessary pursuant to this judgment, the acceleration throttle is reverse-operated from the target acceleration and the brake application, and the acceleration throttle operated by the player is replaced by the reverse operated value (step S27). Nevertheless, the CPU 21 maintains the brake application operated by the player as the brake application information for use in the vehicle behavior calculation processing (step S28).

When the comparative judgment result is YES (i.e., further brake application is required) in aforementioned step S26, the CPU 21 compulsorily controls the acceleration throttle and the brake application. That is, the acceleration throttle operated by the player is replaced by the player is replaced by a full-release acceleration (throttle=0) (step S29). Moreover, the brake application is reverse-operated from the target acceleration and the engine brake, and the brake application operated by the player is replaced by the reverse operated value (step S30).

The estimated acceleration, obtained from the driving state of the driving player, is compared with the ideal acceleration (acceleration upon an experienced player driving). When it is indicated that further braking is necessary pursuant to the comparative results, the acceleration throttle, or both the acceleration throttle and the brake application are automatically and compulsorily controlled (i.e., assisted) to be an ideal value.

Accordingly, by implementing this auto-brake control, the acceleration control and the brake operation of the vehicle (automobile) are automatically conducted. The player is able to drive around the course with only the operation of the steering wheel 11b while full-throttling the accelerator 11c. Moreover, when a player is driving below the speed limit, such player is able to freely control the speed by operating the accelerator 11c and the brake 11d. In other words, without having to provide a separate driving course from those used by advanced players, the difficulty of the game is lowered and adjusted for beginners.

After the setting of the acceleration throttle and brake application in relation to the auto-brake control as mentioned above, the CPU 21 returns to the routine shown in FIG. 3 and operates the vehicle behavior (step S16). Thereby, vehicle postures such as the yawing, rolling and pitching of the vehicle (player car) are operated based on the operational information. Here, elements of TRC, ABS and so on are added to the pitching operation.

Next, the CPU 21 operates the conversion matrix for converting the coordinate system of the virtual three-dimensional space into a two-dimensional visual field coordinate system, and delivers this conversion matrix and shape data to the geometry processor 23.

As a result, the polygon image reflecting this renewed vehicle behavior is displayed on the display 12. By repeating this display per display interrupt, images of the driving state reflecting the operational information and, as necessary, in accordance with the assisted driving state, are provided substantially in real time.

2. Semi-Assist Mode

In the case of the semi-assist mode shown in FIG. 3, the aforementioned auto-brake control is not performed, and similar vehicle behavior calculation and display are made pursuaut to the operational information.

3. Training Mode

The training mode shown in FIG. 3 is now explained in detail. As this mode aims at training the driving player, it is characterized in providing various indications (advice) in advance during driving such as by display and/or sound.

That is, the CPU 21 reads the current operational information of the player (step S21) and thereafter implements the indication processing routine as follows (step S22).

Figure 5:
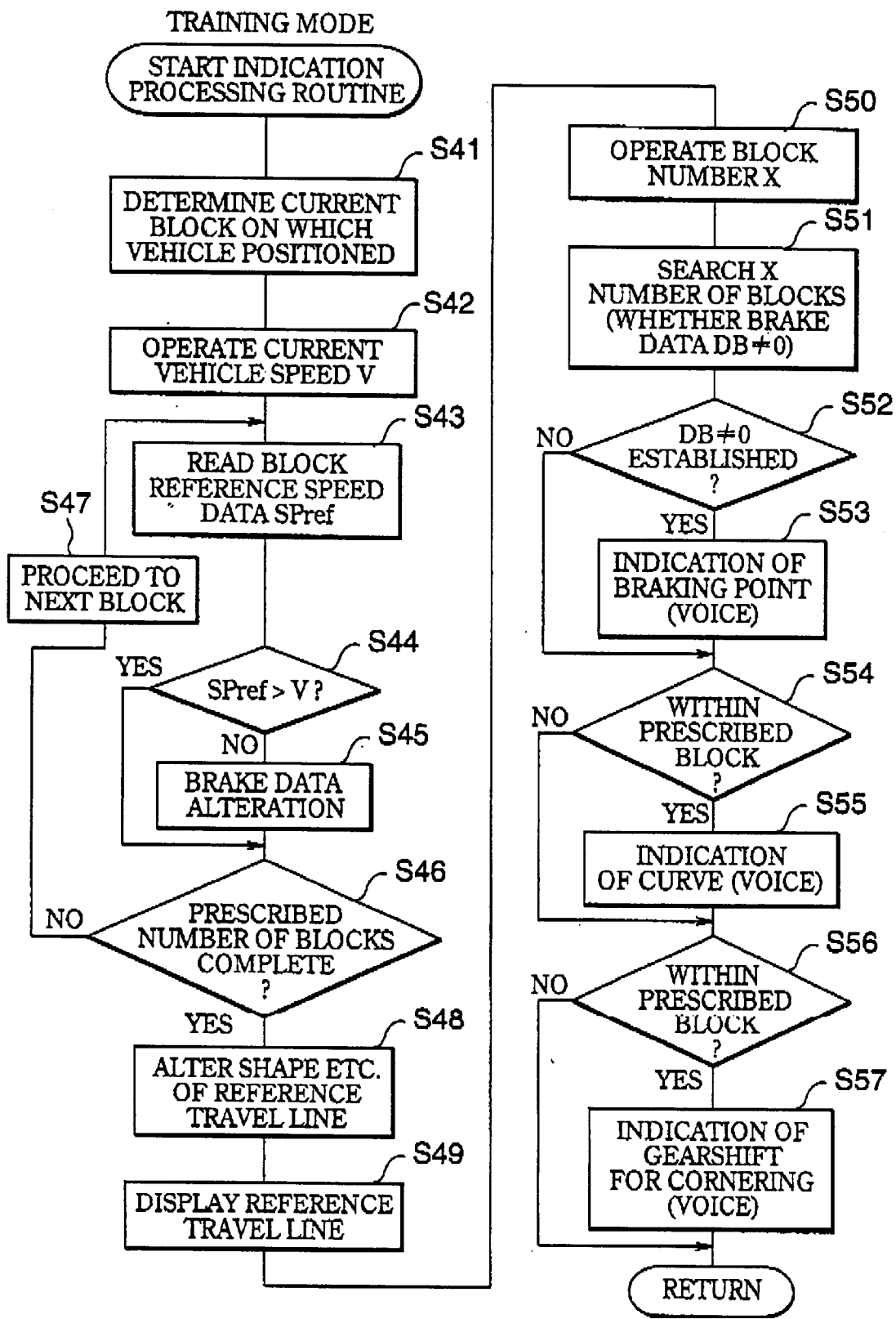
FIG. 5 is a flowchart showing the outline of the indication control in the training mode.

The outline of this indication processing routine is shown in FIG. 5. The CPU 21 determines the current block on which the vehicle is positioned pursuant to the operational information (step S41), and then operates the current vehicle speed V (step S42)

Next, the CPU 21 reads reference speed data $SP_{ref}$ from reference data $DATA_{ref}$ of the current block on which the vehicle is positioned (step S43), and determines whether $SP_{ref}$ is greater than V by comparing such reference speed data $SP_{ref}$ and the actual current vehicle speed V (step S44). When this comparative result is YES, i.e. $SP_{ref}$ is greater than V, the processing for altering brake data DB of reference data $DATA_{ref}$ is performed as described later. Contrarily, when the comparative result is NO, i.e., $SP_{ref}$ is less than or equal to V, the alteration processing of brake data is not performed (step S45). Then, the CPU 21 judges whether this alteration processing has already been completed for a prescribed number of blocks (e.g., blocks of half of the circuit—300 to 400 blocks), and when there is a block still remaining, this block is advanced one block (step S47) and the aforementioned processing is similarly repeated. This processing is implemented per display frame regarding all blocks of a set number ahead of the vehicle.

Figure 6A:
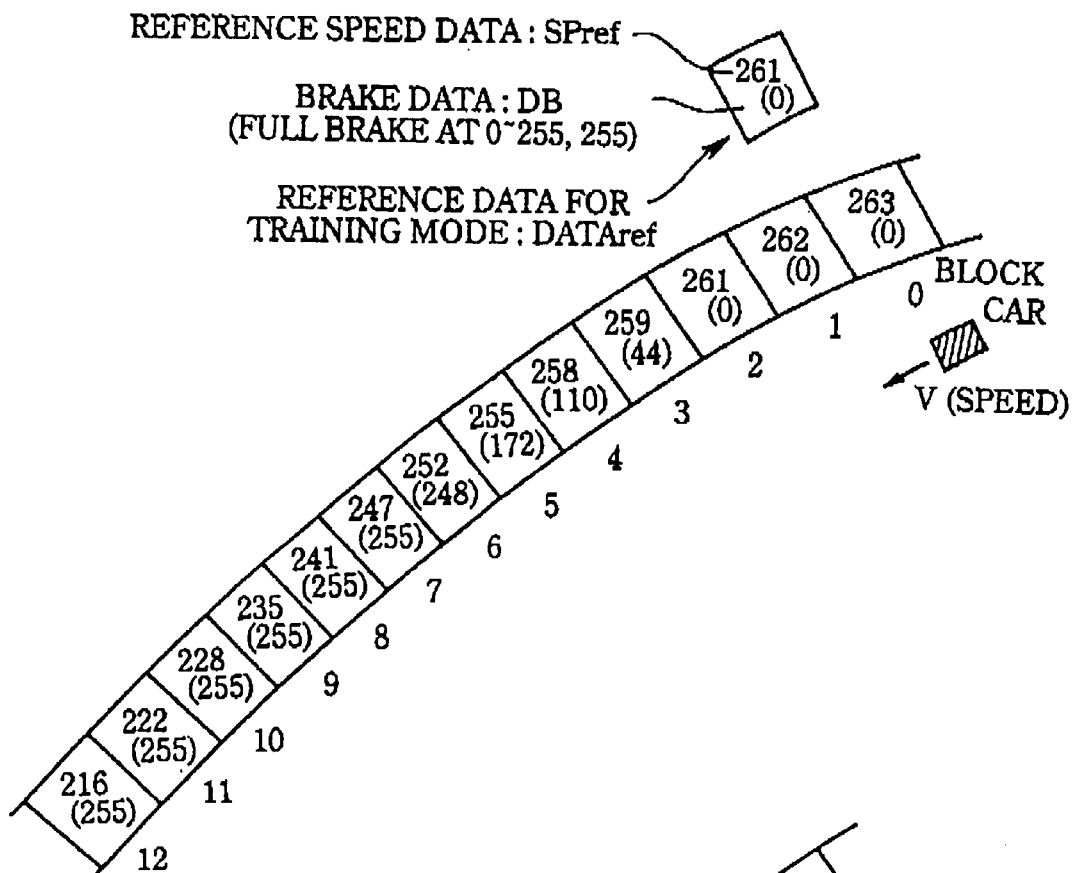
FIG. 6 is a diagram explaining the alteration of brake data in the training mode.

A typical example of this alteration processing achieved by repeating aforementioned steps S41 to S46 is shown in FIG. 6. Here, as shown in FIG. 6(a), a vehicle in a game is positioned on block 0 at a certain time (block of the current position is expressed as standard 0); and reference data $DATA_{ref}$ of blocks 0, 1, 2, . . . positioned in the frontward direction of the vehicle is as shown in the drawing. The speed of the vehicle on block 0 shall be V. As reference speed data $SP_{ref}$ of block 0 is 263 (unit is arbitrary), whether the current vehicle speed V is greater than 263 is judged (c.f. step S44), and when the result is YES, the alteration processing for brake data DB is not implemented. In other words, brake data DB provided as reference data $DATA_{ref}$ is used as is. Contrarily, if the current vehicle speed V is less than or equal to 263, the setting (alteration) of brake data DB is made to be 0. This alteration processing is implemented for a prescribed number of blocks per frame.

Figure 6B:
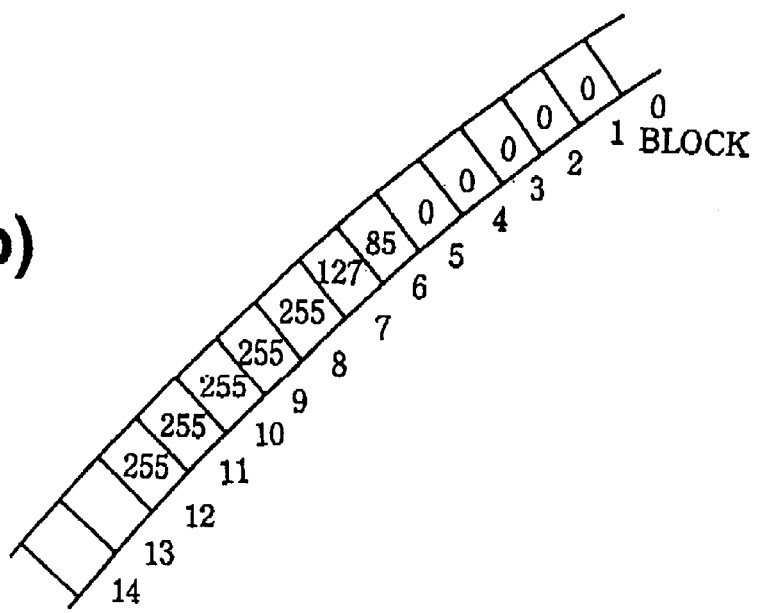
Figure 7:
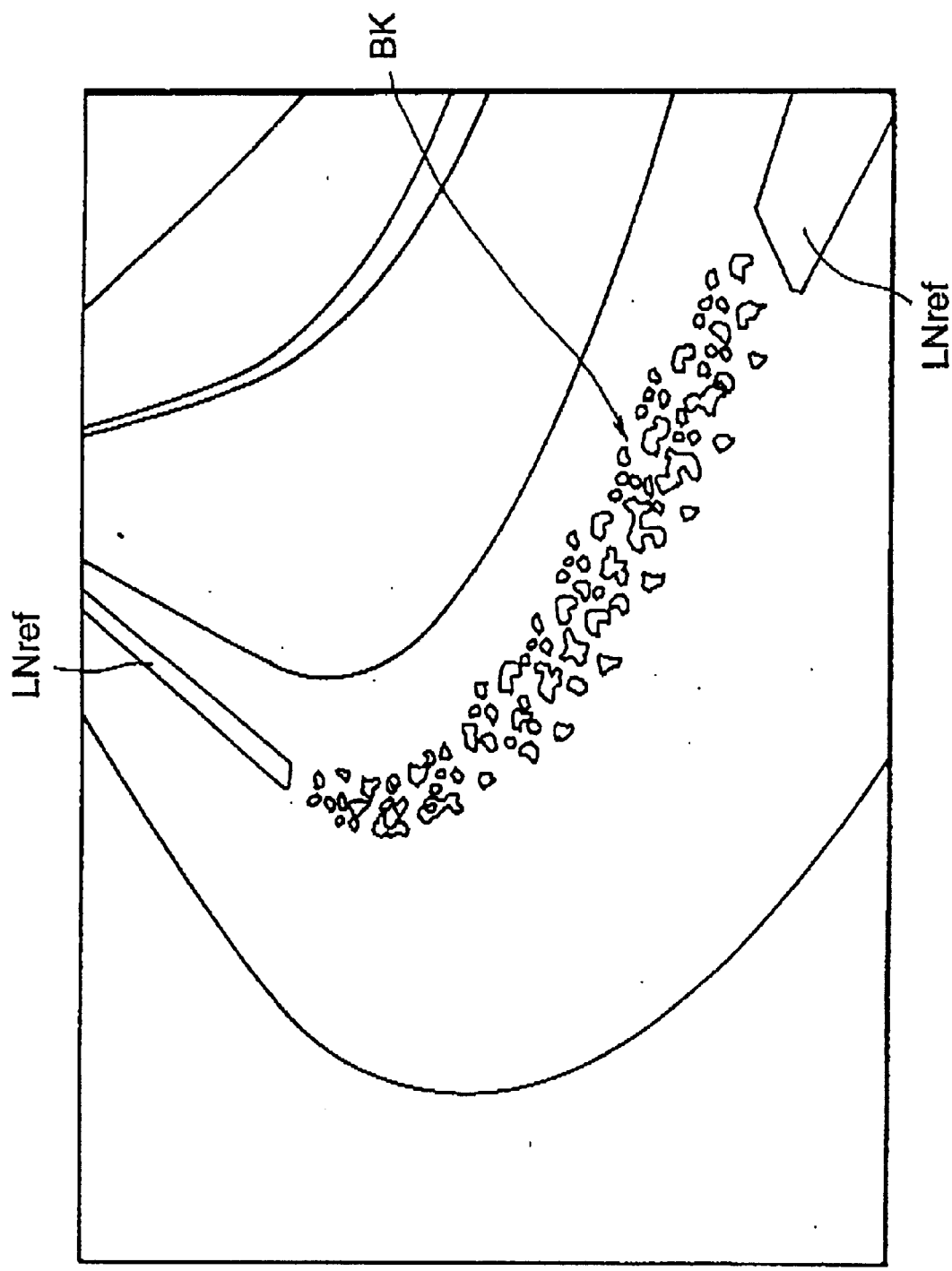
FIG. 7 is an example of a display screen indicating the braking point.
Figure 8:
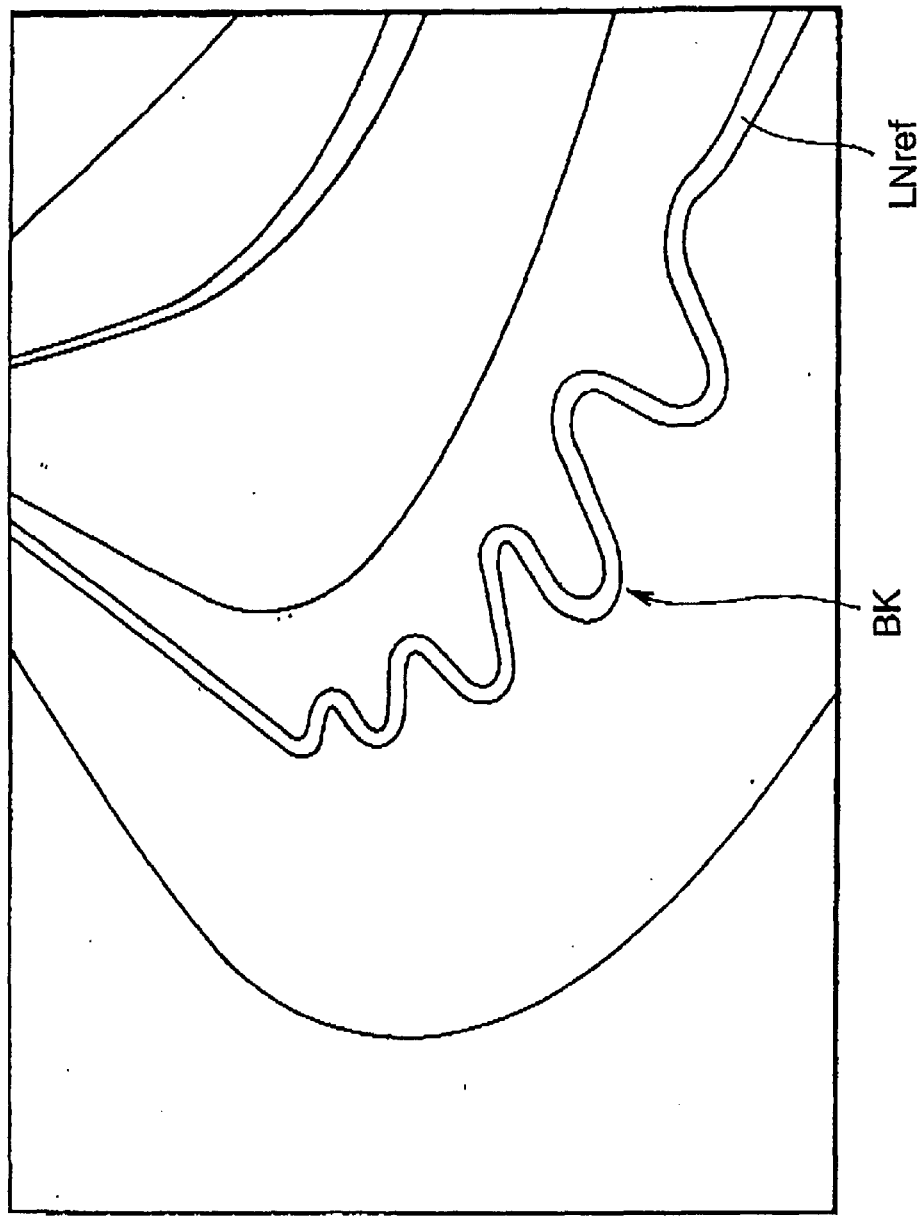
FIG. 8 is an example of a display screen indicating the braking point.
Figure 9:
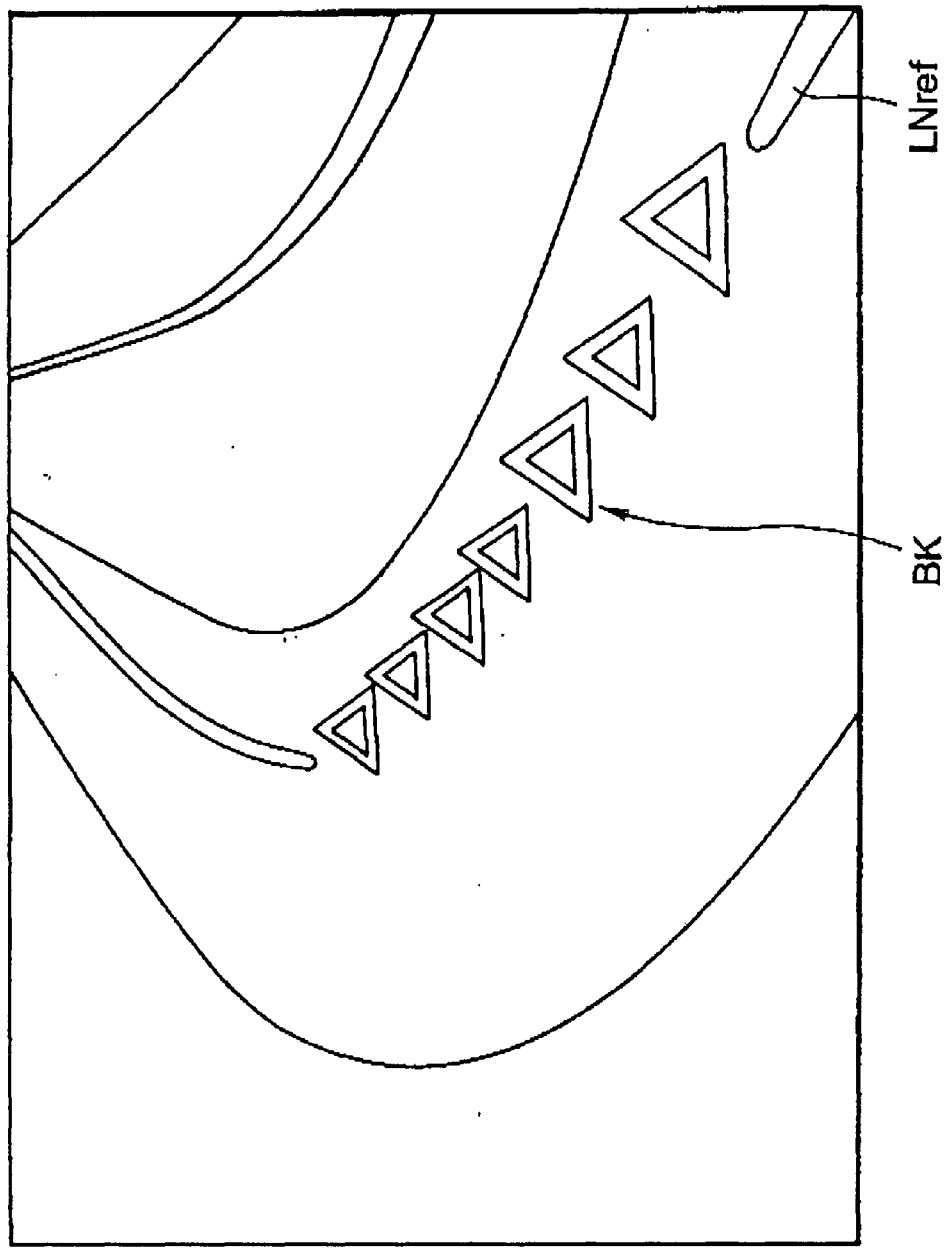
FIG. 9 is an example of a display screen indicating the braking point.
Figure 10:
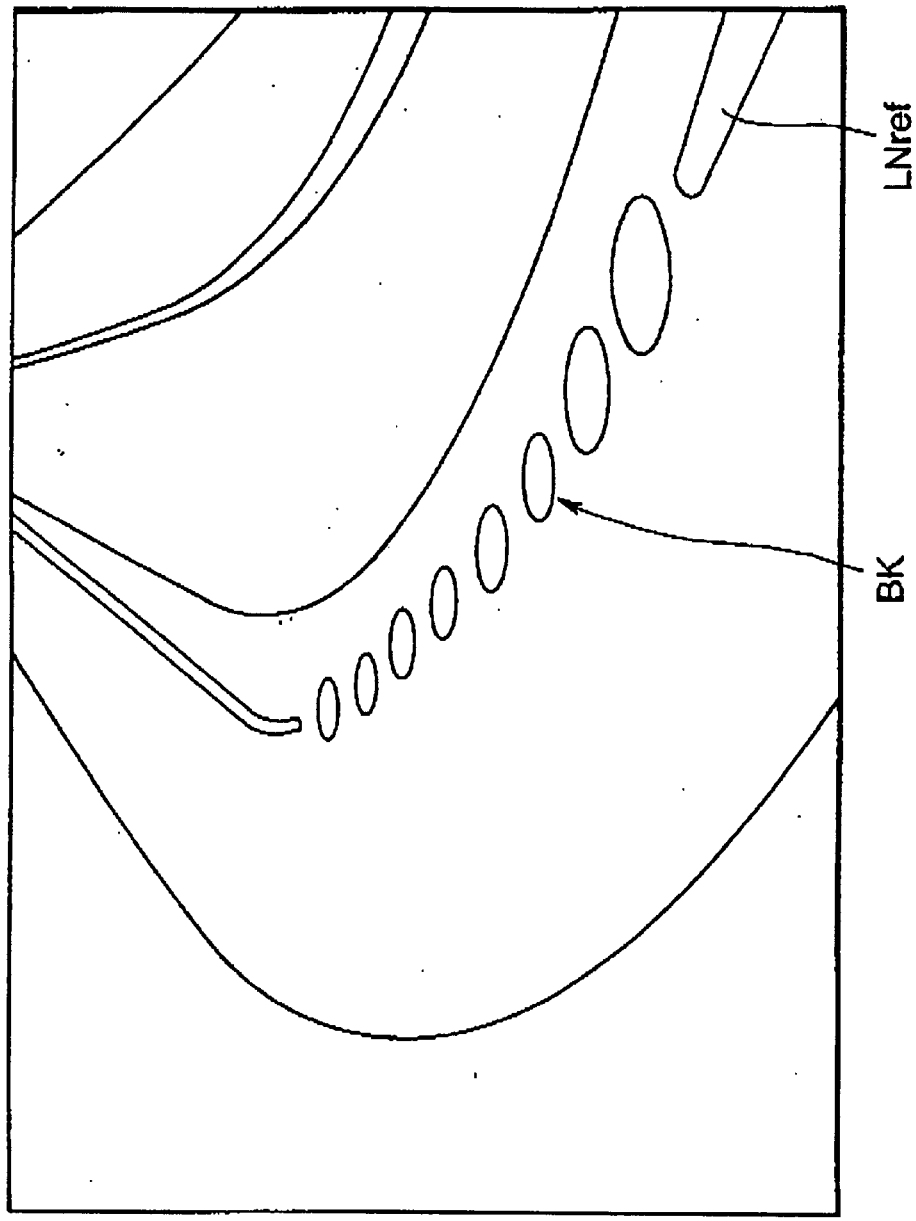
FIG. 10 is an example of a display screen indicating the braking point.
Figure 11:
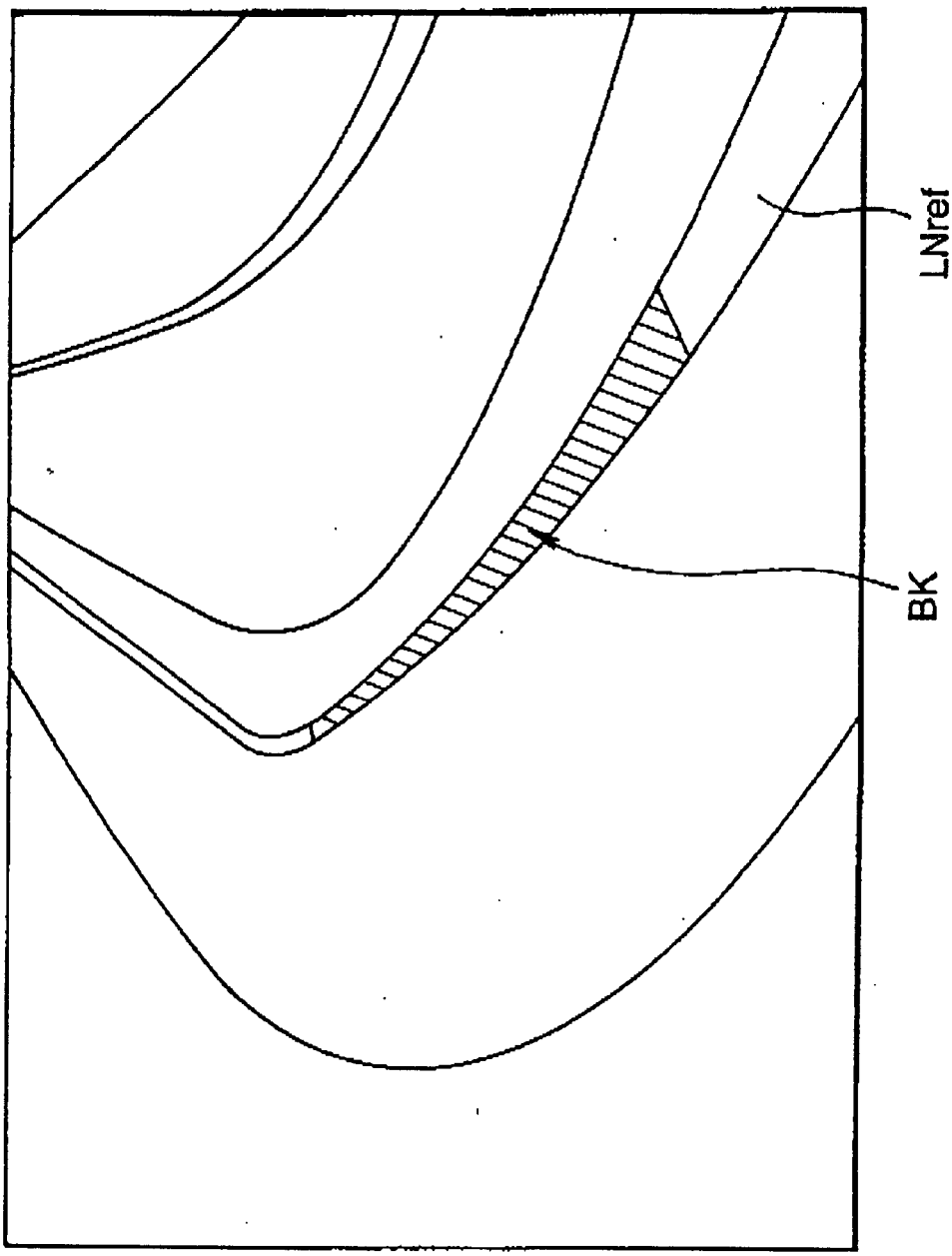
FIG. 11 is an example of a display screen indicating the braking point.

Thus, for example, if the current vehicle speed V is 245 in a certain frame, blocks 0, 1, 2, are successively searched, until a block fulfilling the condition of "V=245<$SP_{ref}$=263" (in block 0) is obtained, and brake data of such block is altered to be "brake data DB=0." In FIG. 6(a), as eight blocks; namely, blocks 0 to 7, fulfill the aforementioned condition, brake data thereof is altered to be "brake data DB=0." Nevertheless, in consideration of the smoothness of the connection of data with block 8 not fulfilling the aforementioned condition, in the alteration processing at step S45, the value of block 7 immediately before block 8 is altered to one half (½) of block 8's brake data DB=255 (=127). The value of block 6, which is two blocks before block 8, is altered to one third (⅓) of block 8's brake data DB=255 (=85). Accordingly, when the vehicle positioned on block 0 has a vehicle speed V, where V is 245, as shown in FIG. 6(b), brake data DB is altered. Here, brake data DB of block 8 and onward is altered to a reference data value of 255.

When brake data DB is altered as above, the CPU 21 then changes the shape of the reference travel line in blocks wherein brake data DB is not zero pursuant to brake data DB which has been altered (step 548). Then, the reference travel line $LN_{ref}$ including such changed line portion is displayed (step S49)

That is, the current vehicle speed V is compared with reference speed data $SP_{ref}$ of a block located several prescribed blocks in front of the current position, and brake data DB is not changed for blocks wherein the vehicle speed V is exceeding reference speed data $SP_{ref}$ within a course range (excluding the two block joints). Therefore, reference travel line $LN_{ref}$ of reference data $DATA_{ref}$ of blocks belonging to this course range is subject to changes in the shape thereof. Meanwhile, as brake data DB of blocks is compulsorily altered to zero, where the vehicle speed V is less than reference speed data $SP_{ref}$, the shape of reference travel line $LN_{ref}$ of blocks presenting brake data DB to be 0 will not be subject to such changes.

In other words, in the range of blocks wherein brake data DB after alteration (adjustment) is not zero, it is desirable that the player steps on the brake pedal 11d, and the shape of the block portions corresponding to brake data DB not being 0 along reference travel line $LN_{ref}$ is changed and displayed.

This reference travel line $LN_{ref}$ is presented to the player by displaying the travel line data (travel route data of an experienced player) of reference data $DATA_{ref}$ in polygons. An indication (advice) is thereby given regarding the ideal line to be taken. Specifically, as reference travel line $LN_{ref}$ is displayed in polygons, the experienced player's vehicle position data in block units is provided to the reference data preparation tool and a left/right two-point x, y, z position having a width of 3 meters is calculated in advance. Here, the left/right two-point y position is calculated as the intersection of the polygon (plane surface) of the travel course and the y axis. As these calculations are made in advance with the reference data preparation tool, the operational load pertaining to the operation of the polygon-apex position is decreased upon displaying reference travel line $LN_{ref}$ as polygons in an actual game.

Upon actually displaying polygons of reference travel, line $LN_{ref}$ in a game, these polygons do not overlap with the polygons of the travel course. That is, as an example, an operation of floating the y position of polygons of reference travel line $LN_{ref}$ 50 cm above the circuit surface (y position+ 50 cm) is performed to display such polygons in a floating state.

Figure 12:
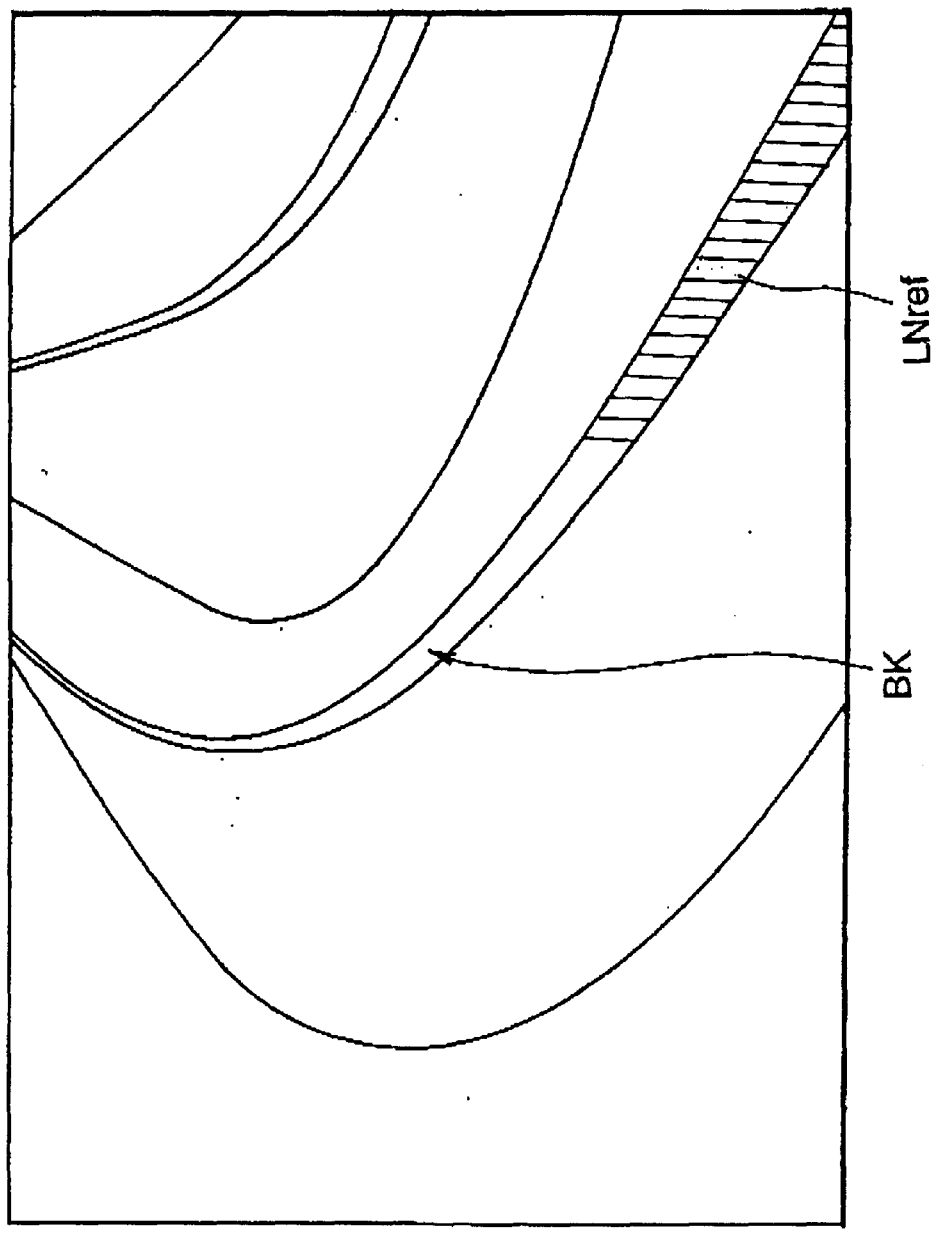
FIG. 12 is an example of a display screen indicating the braking point.

Specific changes and displays of the line shape of reference travel line $LN_{ref}$ may be of various modes as shown in FIGS. 7 to 24. According to reference travel line $LN_{ref}$ shown in FIG. 7, the braking indication region BK is displayed in an aggregate of scattered, dust-like shapes having the same color (yellow) as that of the line. According to reference travel line $LN_{ref}$ shown in FIG. 8, the braking indication region BK is displayed in a curved line having the same color (yellow) as that of the travel line. According to reference travel line $LN_{ref}$ shown in FIG. 9, the braking indication region BK is displayed in a curved line having a different color (red) than that of the travel line. According to reference travel line $LN_{ref}$ shown in FIG. 10, the braking indication region BK is displayed in round marks having a different color (red) than that of the travel line. According to reference travel line $LN_{ref}$ shown in FIG. 11, the braking indication region BK is displayed in a line having a different color (red) than that of the travel line. Reference traveling line $LN_{ref}$ shown in FIG. 12 is displayed by colors being divided into steps from the start of the curve, and the brake indication region BK is displayed in a line having a different color (yellow) than that of the travel line.

Figure 13:
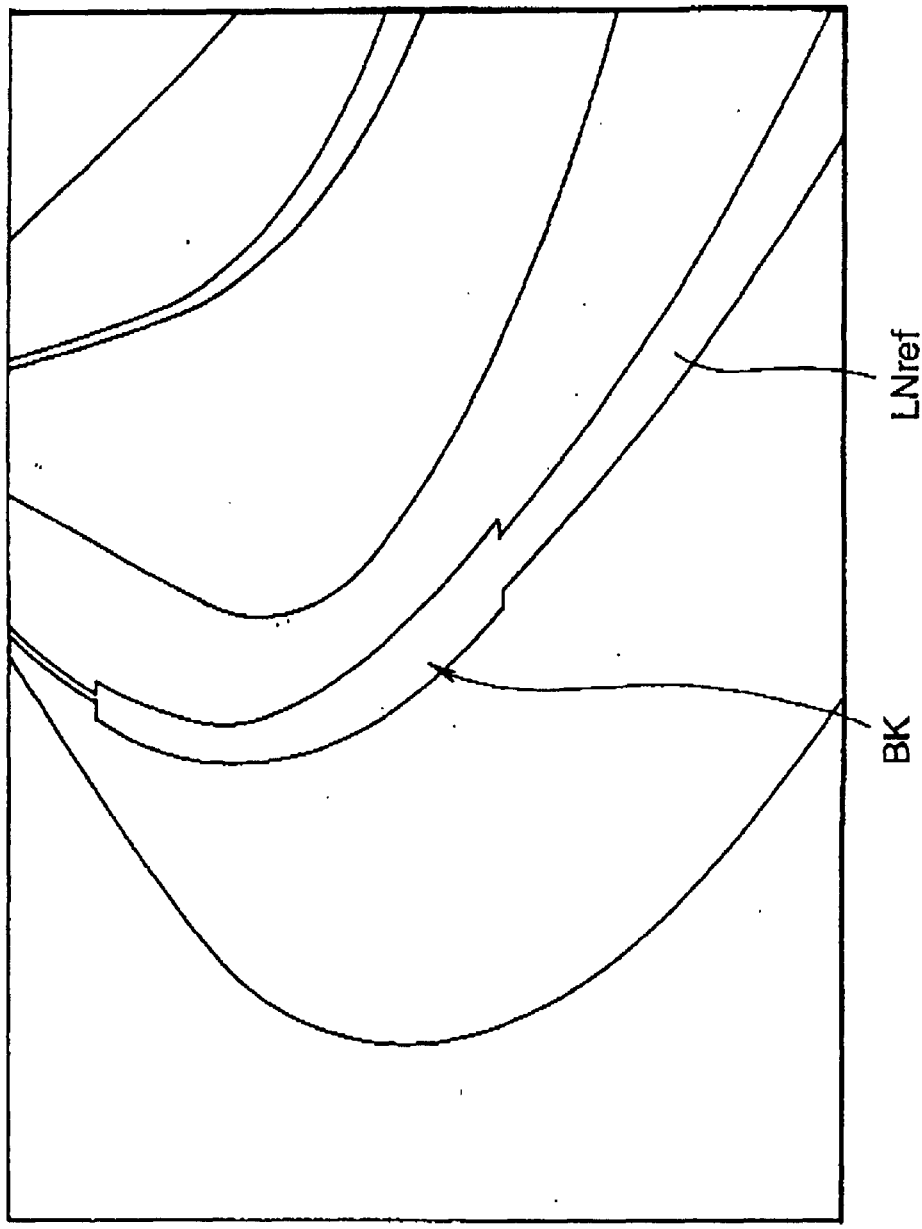
FIG. 13 is an example of a display screen indicating the braking point.
Figure 14:
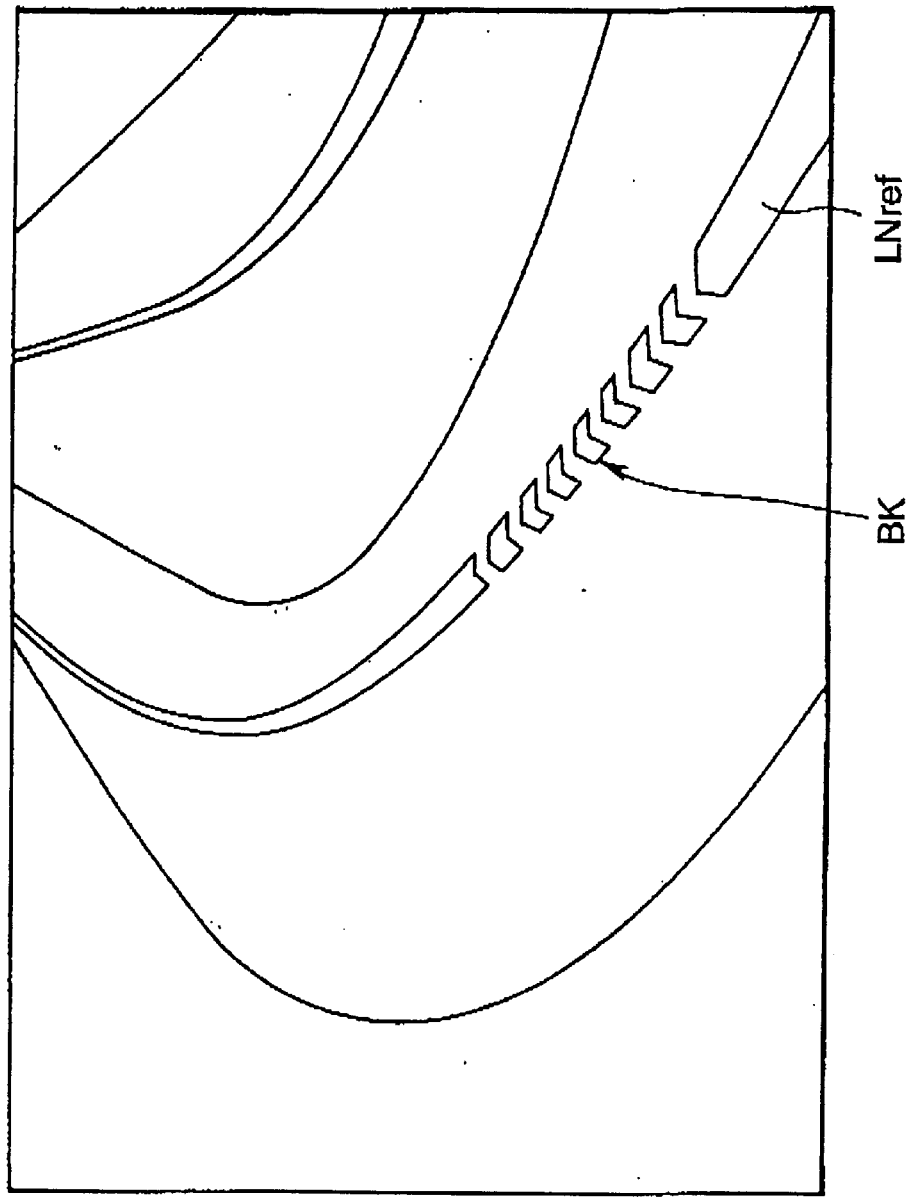
FIG. 14 is an example of a display screen indicating the braking point.
Figure 15:
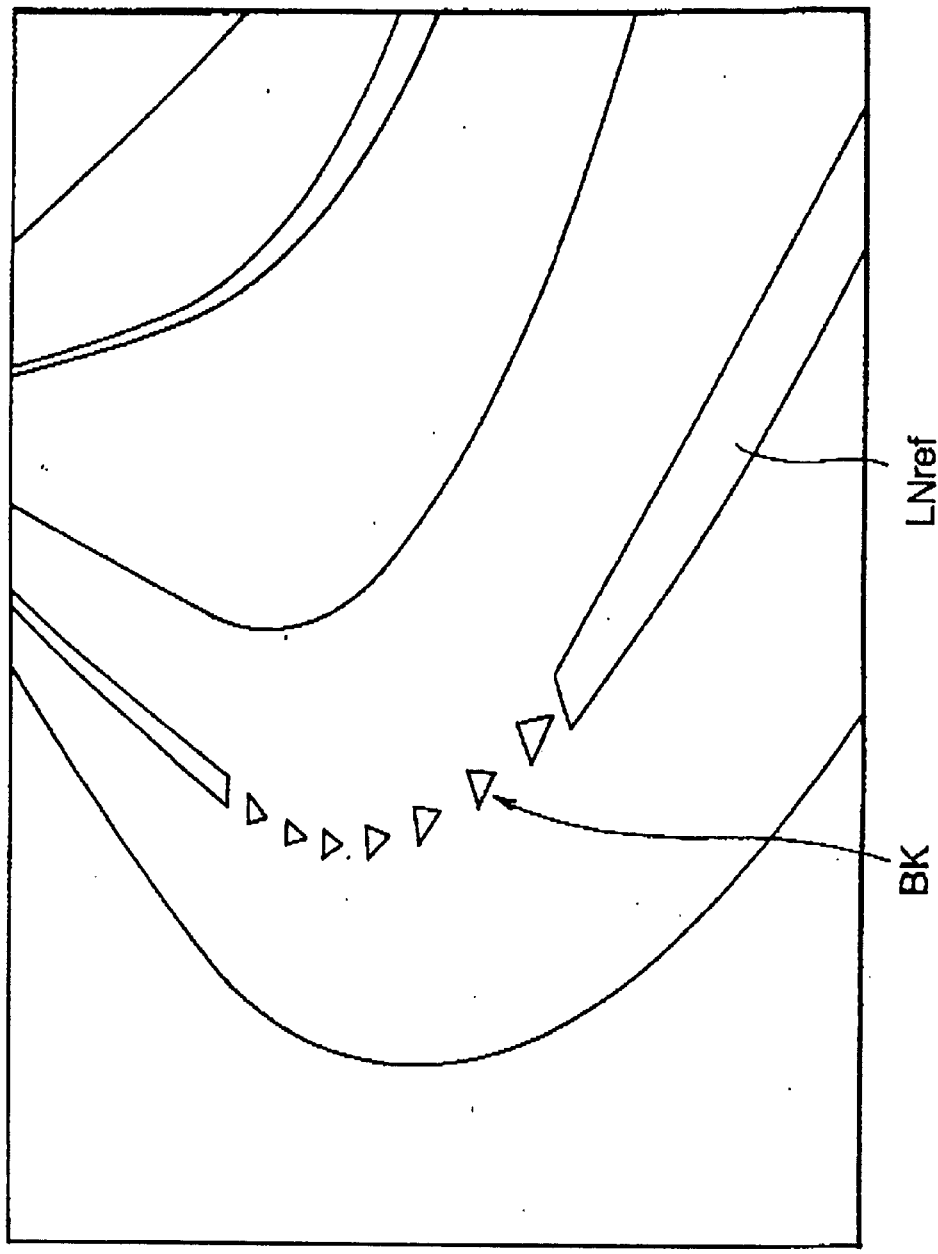
FIG. 15 is an example of a display screen indicating the braking point.
Figure 16:
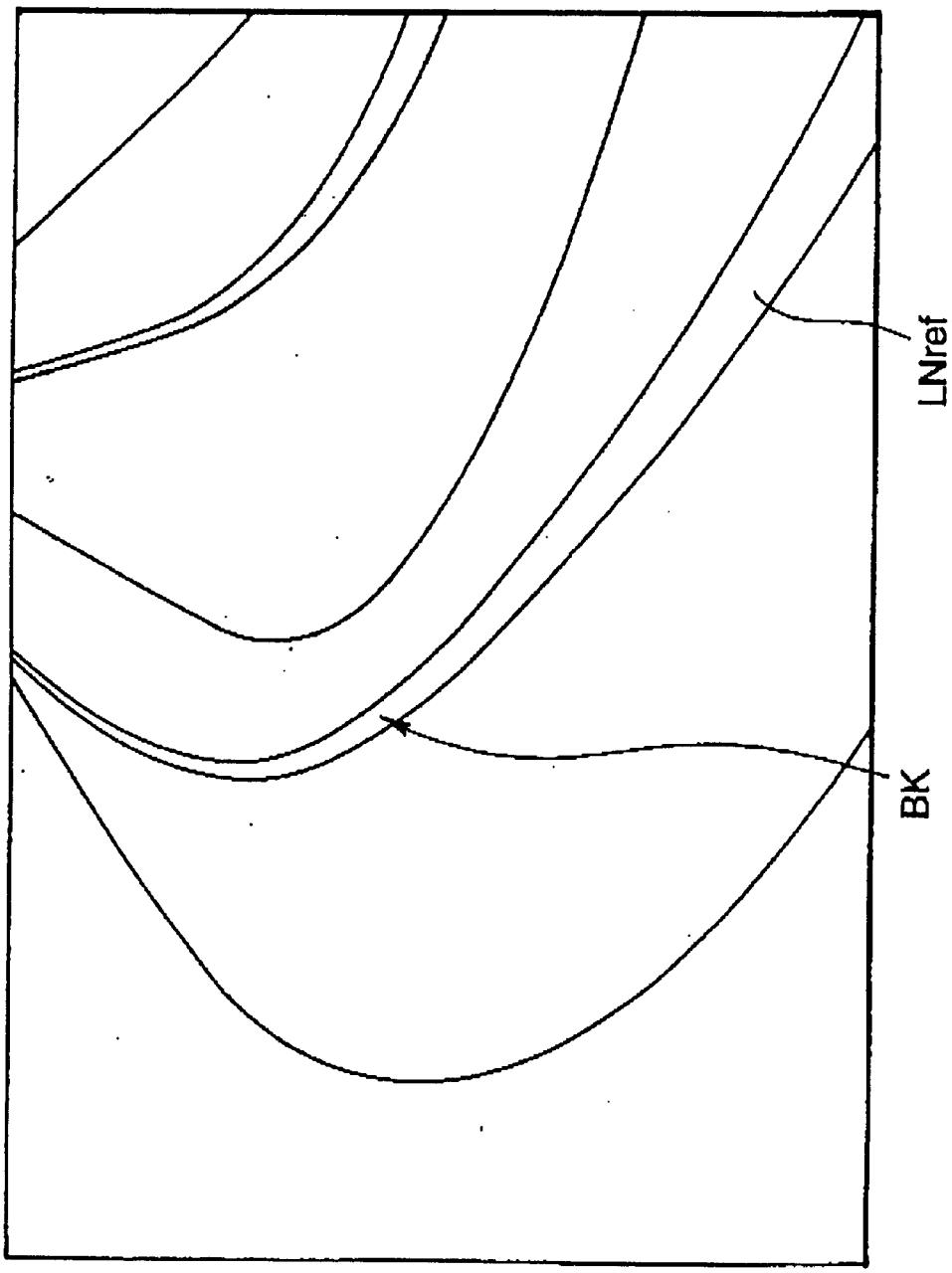
FIG. 16 is an example of a display screen indicating the braking point.
Figure 17:
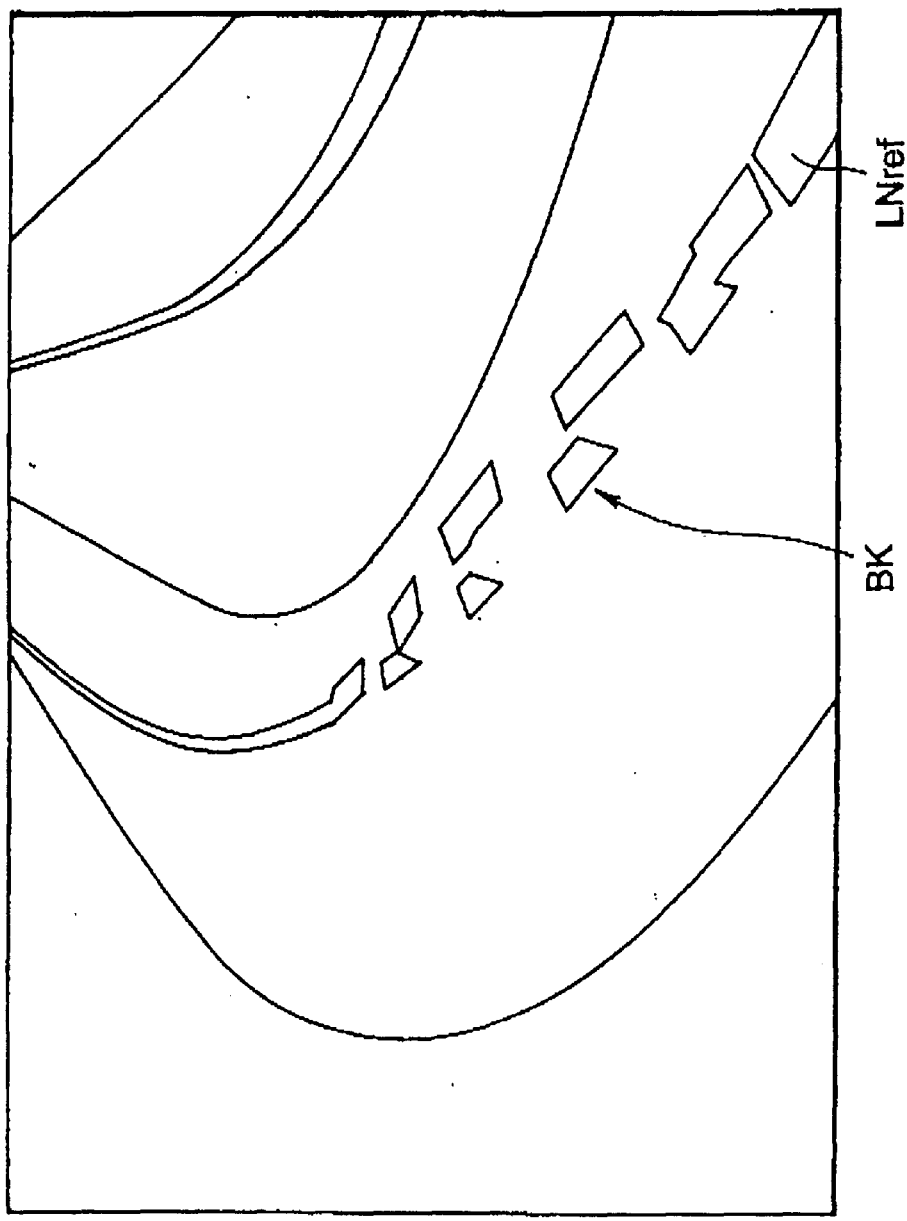
FIG. 17 is an example of a display screen indicating the braking point.
Figure 18:
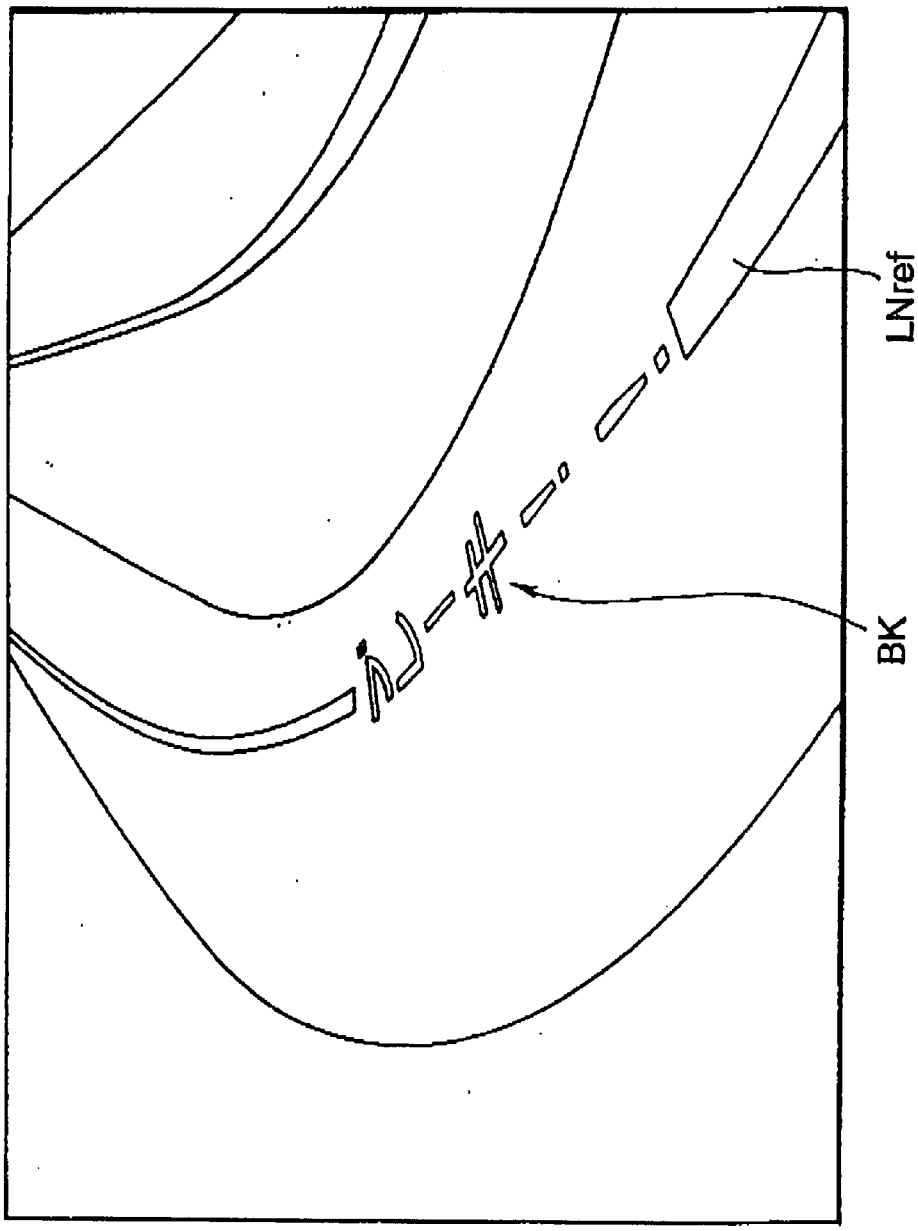
FIG. 18 is an example of a display screen indicating the braking point.
Figure 19:
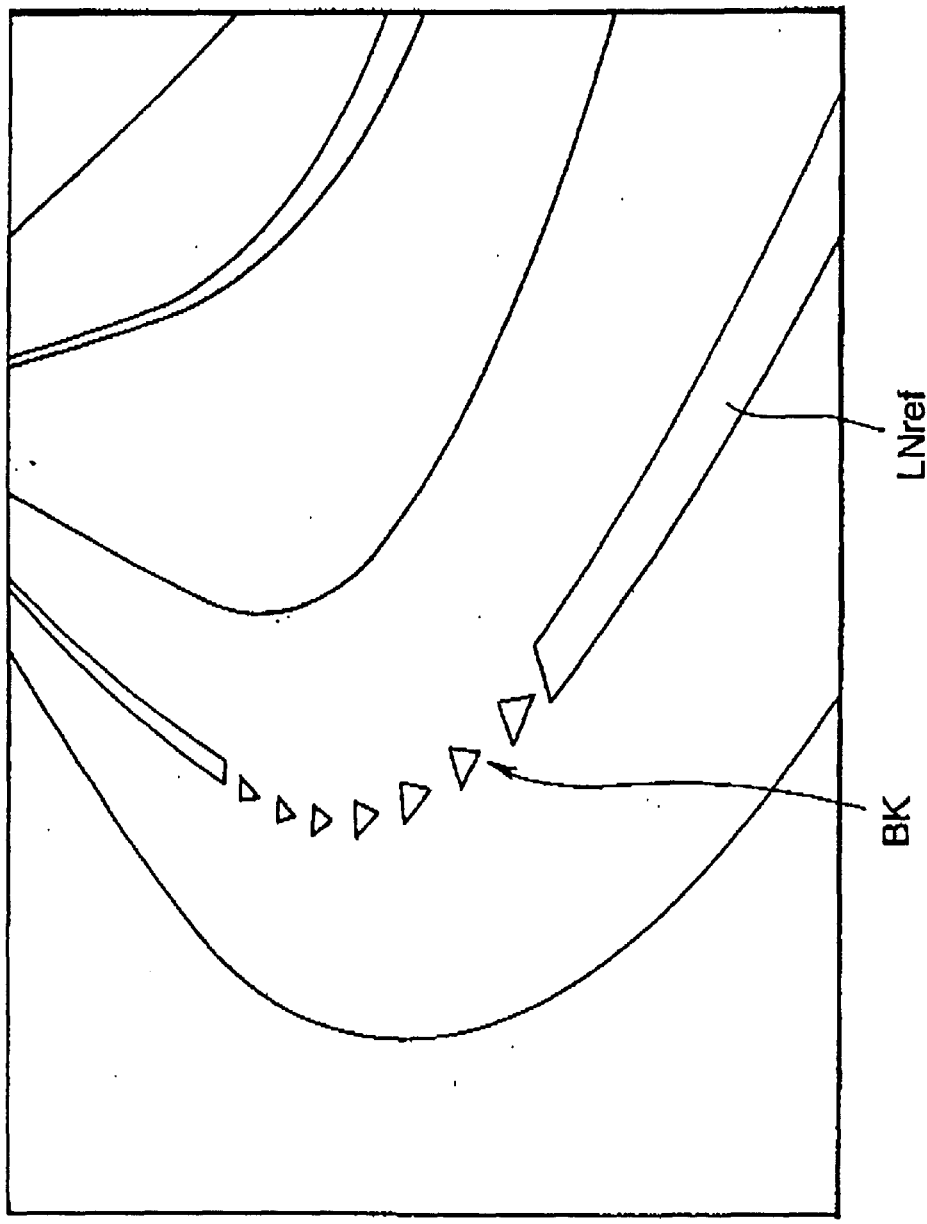
FIG. 19 is an example of a display screen indicating the braking point.

The brake indication region BK is displayed in FIG. 13 as a line having a wider width and a different color (yellow) than that of the travel line, in FIG. 14 as successive symbols of arrowheads, and in FIG. 15 as successive triangle marks. A line having a different color (yellow) is added on the travel line in FIG. 16, three-dimensional boxes are arranged on the travel line in FIG. 17, characters are drawn in the middle of the travel line in FIG. 18, and triangles are arranged on the travel line in FIG. 19.

The braking indication regions shown in FIG. 20(a) and (b) are shown in changing colors (FIG. 20(a): red, FIG. 20(b): orange). The braking indication regions shown in FIG. 21(a) and (b) are also shown in changing colors (FIG. 21(a): green, FIG. 21(b): red).

Figure 22:
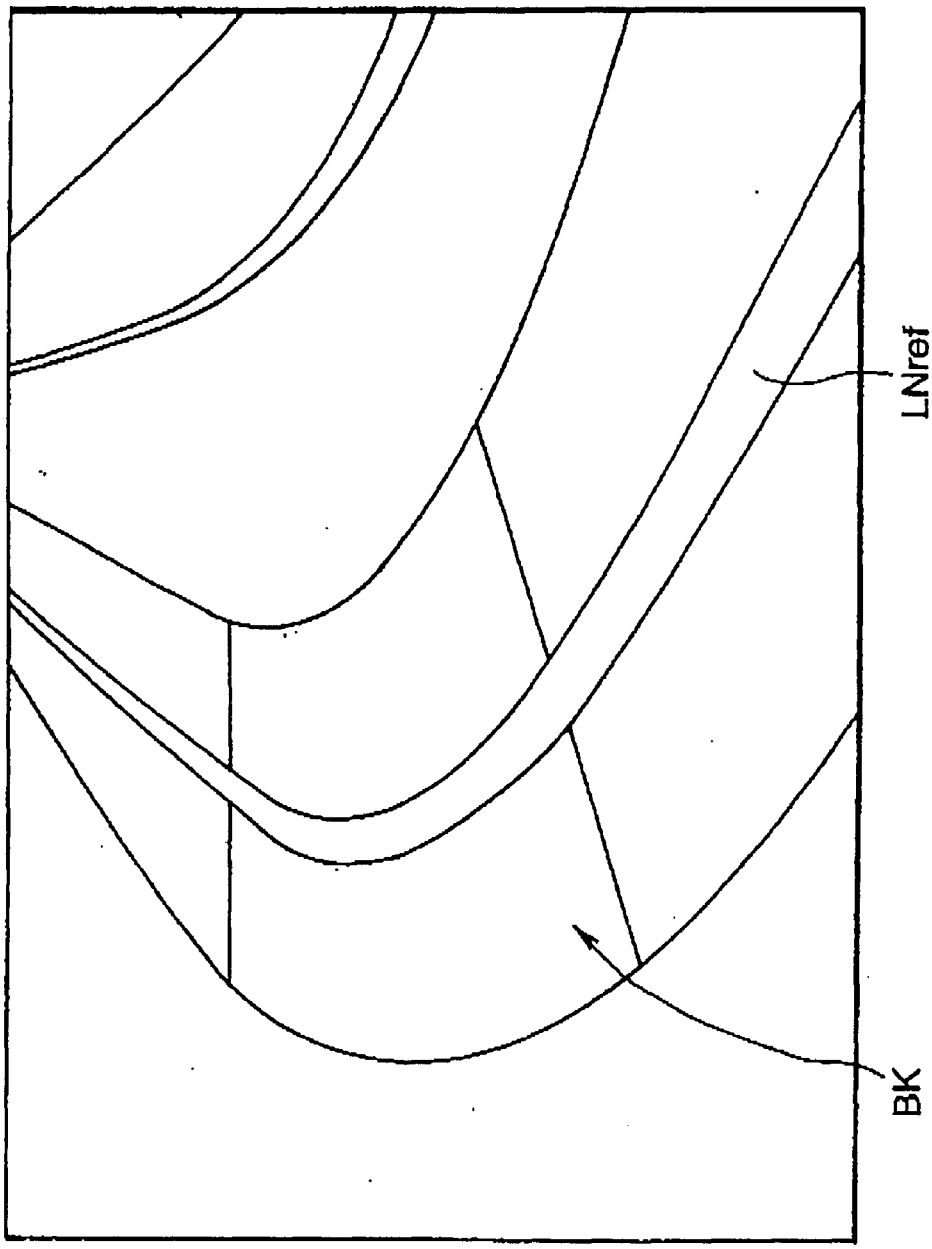
FIG. 22 is an example of a display screen indicating the braking point.
Figure 23:
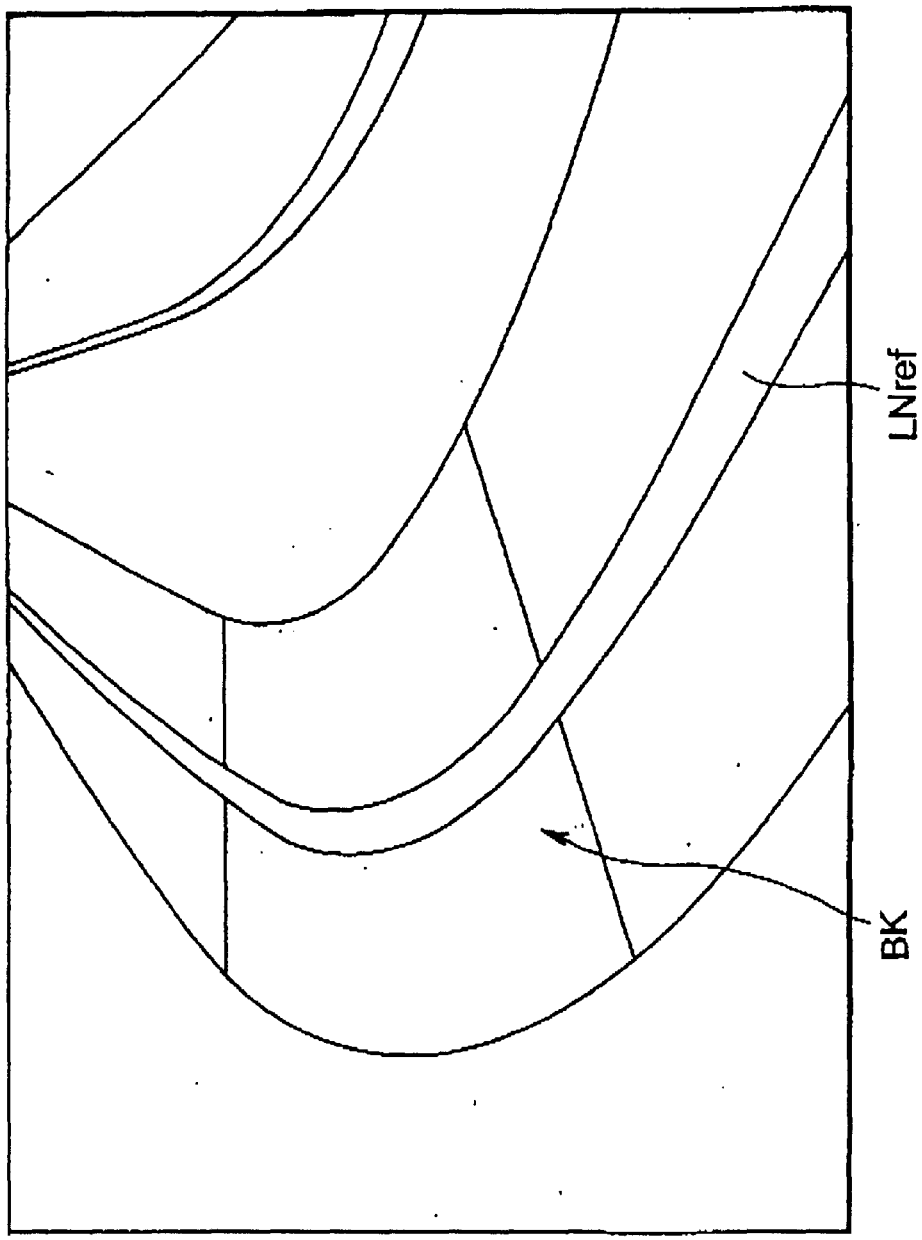
FIG. 23 is an example of a display screen indicating the braking point.

The braking indication region shown in FIG. 22 is displayed by adding to the whole of both sides of the travel line wide sash-like lines having a different color (red) than that of the travel line, and FIG. 23 shows an orange version of such sash-like line.

After the display of reference travel line $LN_{ref}$ in an appropriate mode as mentioned above is completed, the CPU 21 proceeds to the sound indication of the braking point (steps S50 to 52).

That is, block number "X=(V/50)+1" is operated in relation to the current speed V of the vehicle and the value thereof is obtained (step S50). For example, when speed V is 245, block number X is 5. That is, this block number X is a value reflecting the current vehicle speed V. Here, the operational formula of this block number X-may be changed suitably.

Next, from the block on which the vehicle is currently positioned to the block ahead, wherein the number of blocks equals X number of blocks, it is searched whether the brake data is not 0 (step S51). Then, judged is whether "block data DB≠0" is established regarding all blocks for X number of blocks (step S52). When this judgment result is YES (i.e., brake data DB is not 0 for X number of blocks ahead), it is recognized that a part of the course where an application of the brake is necessary is just ahead. Thus, the CPU 21 generates a voice to the effect that "this is a braking point" (step S53).

Nevertheless, when this "brake data DB≠0" is not established, no such voice indication is generated. For example, when a player is driving one's car at a speed slower than that of the experienced player showing the ideal state, the player is able to make the curve without stepping on the brake and, thus, the driving is entrusted to the player without such voice indication being generated.

Thereafter, a voice indication is given for a curve of the circuit (steps S54 and S55). The CPU 21 judges whether or not the player's vehicle arrived at a predetermined block, which is a prescribed number of blocks before the block at the beginning of the curve, based on reference data $DATA_{ref}$ (step S55). When this judgment result is YES, the CPU 21 generates a voice message, such as "a curve is approaching" via the speaker 13 (step S56). Here, the position of the predetermined block showing the arrival at the curve may be changed in accordance with the vehicle speed V at such point. The player is able to appropriately begin turning the steering wheel pursuant to such voice indication of the curve.

Further, the CPU 21 indicates the cornering gearshift (steps S56 and S57). The CPU 21 judges whether the player's vehicle arrived at a predetermined block pursuant to reference data $DATA_{ref}$ (step S56), and indicates via the speaker 13 a preset optimum gearshift position for cornering (i.e., the ideal gearshift position of an experienced player), indicating a voice message such as "make the curve in first gear" and the like. Thereby, the player is able to operate the gearshift 11e to the position indicated by the voice message.

Thereby, the various indications (advice) in the training mode pertaining to step S22 shown in FIG. 5 are given by voices or images. Thereafter in this training mode, the CPU 21 operates data representing the vehicle behavior in accordance with the operational state or traveling state, and further performs game processing such as perspective conversion processing for displaying polygons of vehicles or the traveling line (including the reference travel line) and background image processing (FIG. 5, steps S23 and S24). The processing then returns to the main program until the next display interrupt.

Meanwhile, when the judgment result is NO at step S13 in the main routine processing shown in FIG. 5; that is, when the selected driving mode is judged as being the simulation mode, the CPU successively reads the operational information of the player, performs behavior operation of the vehicle, and performs game processing as mentioned above (steps S25 to S27). In other words, the indications (advice) given in the training mode are not provided in this simulation mode at all. That is to say, the game amusement is restrained to a minimum, and provided is a driving game with an increased simulation element where the player's raw driving technique is challenged. This simulation mode is therefor preferable for advanced players experienced with driving.

In the game device provided in the present embodiment, as mentioned above, prepared are a plurality of driving modes set to concur with the driving techniques of beginners to those advanced such that players of all levels may enjoy the game. As players of various driving levels may enjoy the game even though it is the same circuit, a plurality of circuits with differing difficulties are not required and, as a total, data of the circuit is suppressed, and the memory occupancy thereof is minimized.

If a beginner player selects the assist mode, such player may resort to the auto-brake control and play the driving game with more game amusement than the simulation element. And, although such beginner drives along the same course used by advanced players, he/she may obtain respectable game results and therefore maintain the interest in game participation upon competing with friends. A beginner who becomes familiar with the assist mode may try the semi-assist mode for a further challenge.

An advanced player may select the training mode or simulation mode. The player may thereby challenge a difficult game laying emphasis on simulation, and such player's spirit in the game is provoked. Even though a player may be advanced, depending on his/her driving skill, such player may first select and practice on the training mode and then challenge the simulation mode. As the ideal traveling line, braking point, curves, and the cornering gearshift are indicated via voices and/or images in the training mode, the player may improve one's driving technique upon incorporating such indications. Here, as there is no automatic participation by the device regarding the traveling state, one's own driving skill may be confirmed to a certain degree, a reasonable degree of simulation is secured, and interest and expectation in the game are maintained.

Accordingly, provided is a driving game, wherein players having various driving skills—from beginners to those advanced—may enjoy both aspects of amusement and simulation in consistency.

Second Embodiment

The game device pertaining to the second embodiment of the present invention is now explained with reference to FIGS. 24 to 27. The hardware structure of the game device in this embodiment is the game as, or similar to, the first embodiment.

This game device is characterized by including, in addition to the driving pursuant to the aforementioned plurality of driving modes, processing (trace display processing) for displaying skid marks (or tire marks) pertaining to skidding or locking of tires on the circuit (traveling line).

Upon driving on a road surface in an actual space, skid marks once made on the road surface remain for a considerable period of time. Especially on courses such as race circuits, skid marks remain without disappearing as drivers drive in a similar manner at the same curve. Thus, vehicles coming around, the corner may judge the line to take or the braking point by referring to such skid marks. Particularly in a simulation game, as the camera viewpoint is positioned at the driver's eye level in pursuit of reality, skid marks become an important signal to the driver upon progressing in the game. Therefore, it is desirable to display such skid marks without having to place an excessive burden on the game processing.

The display processing of such skid marks is implemented with the CPU 21 performing software processing as follows.

Figure 24:
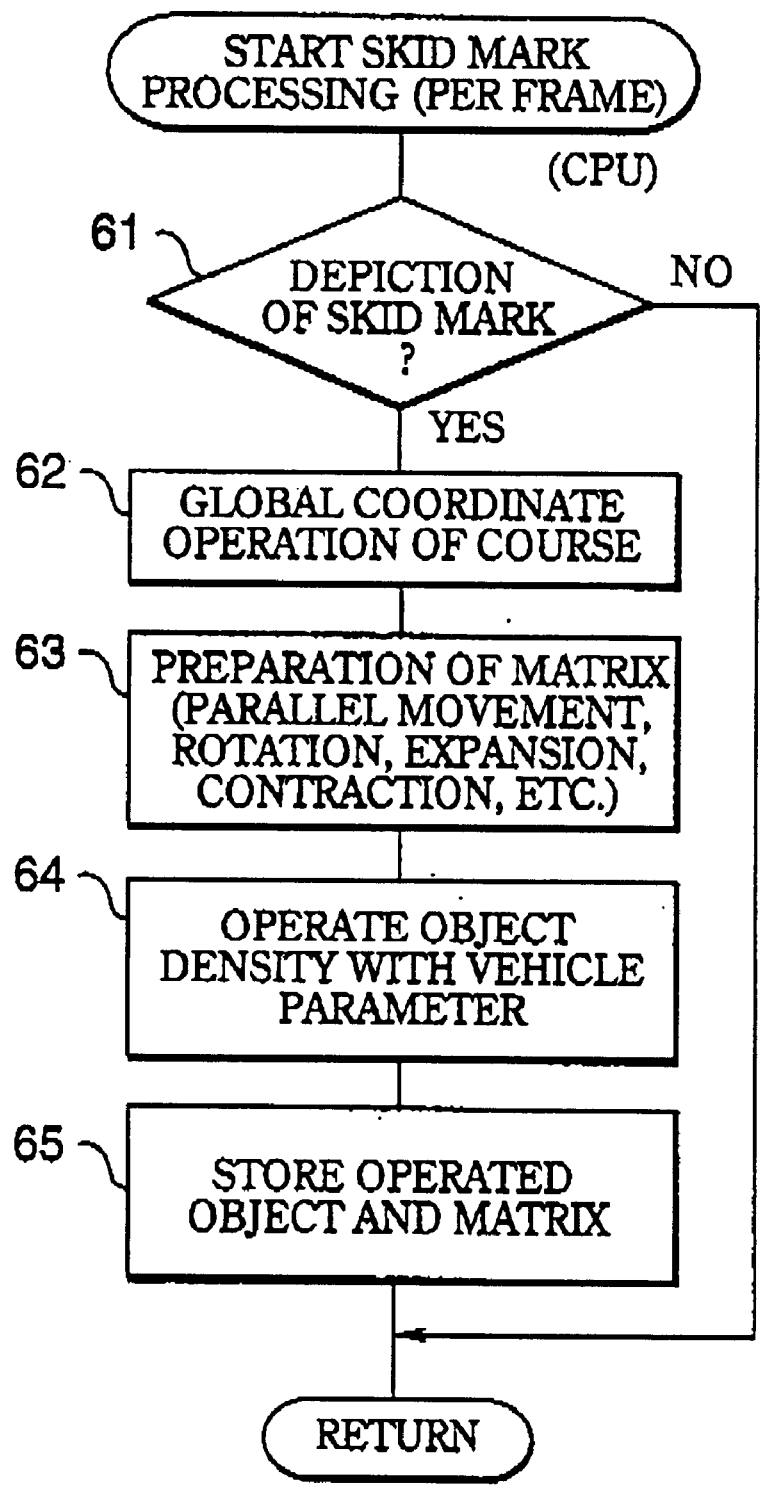
FIG. 24 is a flowchart showing an outline of the skid mark (trace) processing according to the second embodiment.

During the implementation of the main program, the CPU 21 performs operations and storage processing of polygons (objects) representing skid marks shown in FIG. 24 per frame and in an appropriate timing.

Foremost, the CPU 21 judges whether it is a traveling state for generating skid marks (tire marks) (step 61). This is determined by whether parameters such as acceleration, deceleration, yawing, etc. representing the traveling state of the vehicle fulfill predetermined conditions. When this judgment result is YES, the CPU 21 thereafter operates the global coordinates from the respective positions of the tires of the vehicle and operates the matrix of the object (polygons representing skid marks) upon referring to the direction and scale thereof (step 62, 63).

Specifically, object matrix [A] is operated pursuant to the following modeling conversion formula:

[A]=[basic matrix of course]×(position matrix of polygons]×[rotation matrix of polygons]×[expansion/contraction matrix of polygons].

The position matrix of polygons is the matrix of positions x, y, z in an absolute coordinate system of the arranged polygons. The rotation matrix of polygons is the matrix for obtaining the rotational components of the arranged polygons pursuant to inclination α of the vehicle or road surface. Further, the expansion/contraction matrix of polygons is the matrix for determining the scale of polygons decided pursuant to the vehicle speed, vehicle displacement during one frame, and tire width.

Next, the operated matrix [A] is stored together with the object (polygons) in the internal SRAM (not shown) of the system memory 23 (step 65). Here, if the data (object and matrix thereof) stored in the SRAM reaches a predetermined constant, upon storing data thereafter, oldest data in a time series is deleted, and newest data is stored in place thereof. This deletion is performed in one-mark units (from the beginning to the end of a series of traces (marks) generated by a single spin or skid). The length of one mark is predetermined.

If the judgment result is NO in step 61; i.e., no display of skid marks, processing of aforementioned steps 62 to 65 is skipped.

Figure 25:
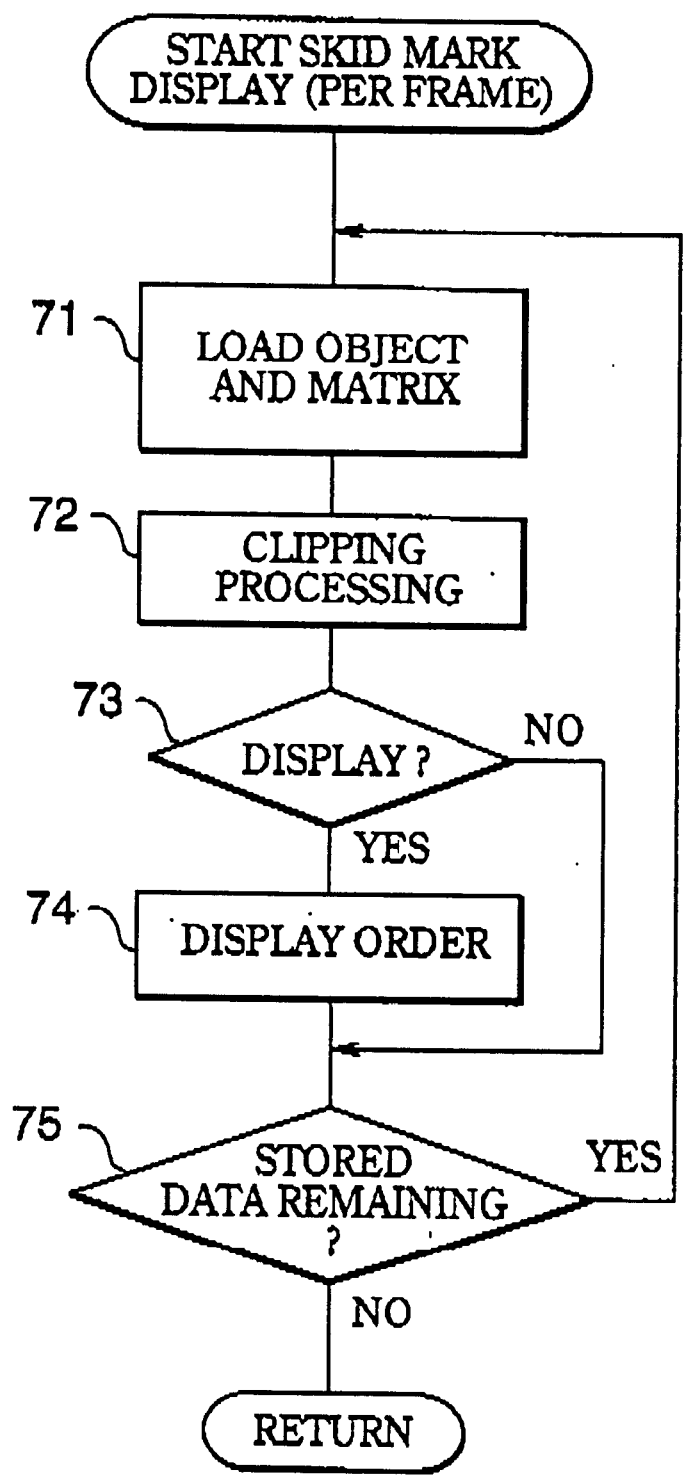
FIG. 25 is a flowchart showing an outline of the display of skid marks (traces)

Moreover, during the execution of the main program, the CPU 21, in addition to the display processing of game results, orders the display of skid marks pursuant to the processing shown in FIG. 25 per frame and for each tire.

Figure 26:
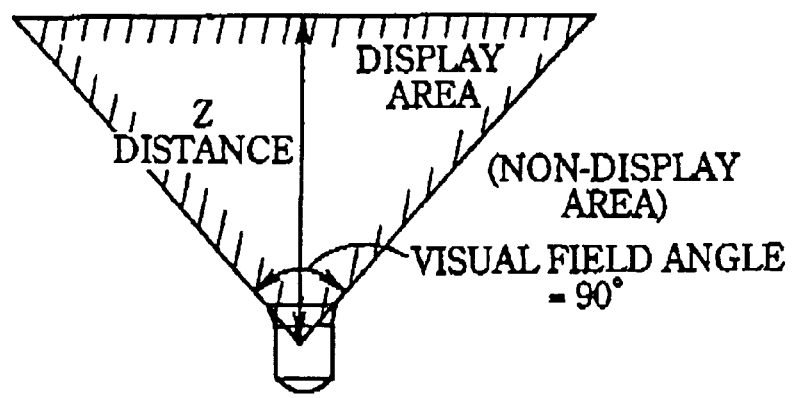
FIG. 26 is a diagram explaining the clipping of skidmarks.

Specifically, the CPU 21 reads the object (polygons representing skid marks) and the matrix thereof for the one designated tire (step 71). Next, the CPU 21 judges whether the read object is positioned within the visual field (display area) pursuant to the z distance from the camera viewpoint virtually set as shown in FIG. 26 and the visual angle of the viewpoint thereof. The object becomes the subject of display when positioned within the visual field, and is clipped when outside such visual field (step 72, 73).

Figure 27:
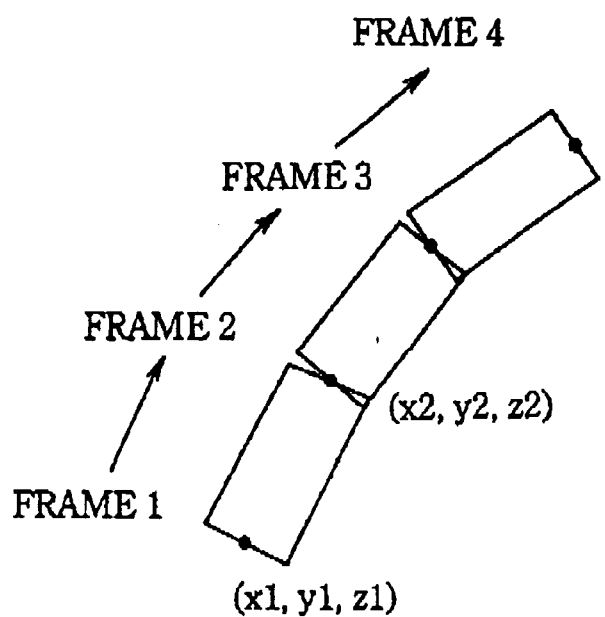
FIG. 27 is a diagram explaining the display of skid marks.

Thereafter, a display order is given to the polygons positioned within the display area (step 74). Particularly, as shown in FIG. 27, the front end and back end of the current frame are determined from the front end point (x2, y2, z2) of the polygons which moved during one frame and the front end point thereof of the preceding frame (x1, y1, z1), and the respective polygons are spatially and coritinuously displayed per frame. Thereby, the player sees the polygons representing the skid marks of tires as extending. As mentioned above, however, as the number of storable polygons in one-mark units is limited to a predetermined value, the length of extending the skid marks is also restricted to be within a prescribed distance.

Next, the CPU 21 judges whether any stored object still remains and, if remaining, returns to step 71. And, while repeating the aforementioned display order processing, upon completing a display order for one-frame worth of stored data, the CPU 21 returns the processing to the main program and stands by (step 75). Thereby, display orders of skid marks are attempted per frame against all four wheels of the vehicle and within a predetermined number of laps.

In other words, when all four wheels are skidding or drifting, skid marks for all four wheels are displayed. When only the two front wheels among the four wheels are in such traveling state, skid marks for only those two front wheels are displayed. Further, skid marks are displayed for a predetermined number of laps, including the current lap.

For example, let it be assumed that the camera viewpoint during the first lap is positioned to the rear upper direction of the vehicle and is chasing the player's vehicle from the sky in such position. And, when a player's driving makes the vehicle skid at a certain curve, skid marks pursuant to such skidding are operated, and polygons are displayed. That is, skid mark polygons of each wheel are operated within a predetermined length, and the density thereof is obtained in accordance with the degree of skidding and displayed. As the player is driving while viewing this screen, naturally, he/she may see such skid marks. Together with this display, the polygons representing such skid marks and the matrix thereof are stored in the internal SRAM of the system memory 23.

Further suppose that the player wishes to change the cameral viewpoint during the second lap to, for example, the eye level ot the driver inside the vehicle. Here, when approaching the aforementioned curve, the first skid marks (skid marks in one-mark units for each wheel) are displayed upon the matrix already operated and stored during the first lap being read out. Therefore, the player assimilated with the camera viewpoint can see the first skid marks ahead and measure the brake timing upon visually referring to such skid marks. Thus provided is a highly realistic screen and, while improving the simulation element and game amusement, contribution is made to the improvement in the players driving technique.

If the player also makes one's vehicle skid at the same curve during the second lap, skid marks pursuant to this driving are operated, and similarly stored. Thus, if the camera viewpoint is also positioned at the driver's eye level during the third lap, skid marks from both the first lap and the second lap are incorporated into being subject to display in the clipping processing. In other words, when approaching such curve during the third lap, skid marks of the first and second laps are displayed as partially overlapping skid marks, or as completely separate skid marks. Accordingly, it is possible to accurately grasp the previous traveling states and utilize the same upon approaching such curve again.

Similarly, the display of such previous skid marks may be stored in the SRAM to the maximum limit in the number of mark units.

As mentioned above, the matrix of the skid marks calculated at the time of driving is stored and, without having to re-operate the same, such matrix is merely read out and displayed. Therefore, even upon displaying previous skid marks, it is possible to perform the operation and processing of displaying polygons representing the skid marks at high speed. On the other hand, without having to increase the operational load of the CPU, provided is a highly realistic image of leaving the previous skid marks for a long period of time on the screen. Moreover, as the skid mark polygons to be stored are data groups (data after completing the operation of the position of polygon, scale, and inclination) immediately after the texture has been af fixed, such polygons may be drawn in a similar manner as with that of ordinary background data, and the memory capacity necessary for the storage thereof may be minimized.

Conventionally, upon displaying skid marks, initially generated polygons were successively performed semi-transparent processing and erased in order to prevent exceeding the predetermined memory capacity. Contrarily, in the present embodiment, in comparison to conventional devices, provided is a highly simulative image such as skid marks remaining on the course without having to increase the memory capacity and without otherwise influencing the game processing (at high speed). This image may be respectively provided in the various driving modes described in the first embodiment and will further provoke the player's interest in the game.

As a matter of course, the present invention is not limited to the game device of the aforementioned embodiments, and the game device of this invention may be variously altered or modified within the scope of the gist of the invention described in the claims. For example, the game contents which may be played with the game device of the present invention are not limited to the driving game for the competition of lap times upon driving around a circuit as mentioned above. The game may be a car race game wherein a plurality of cars compete for lap times. Further, other than objects related to vehicles, for example, the objects may be water skis, snow skis, or motorcycles.

Figure 28:
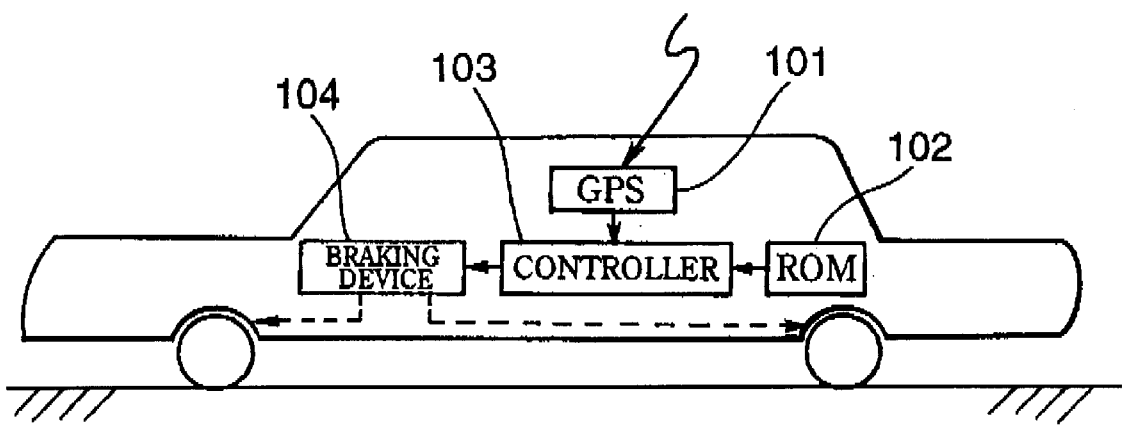
FIG. 28 is a structural diagram conceptually representing the vehicle brake-control device of the present iavention.

Although the aforementioned first embodiment described a driving game device for driving on a virtual space as one invention of the present application, this invention is also capable of providing a vehicle brake-control system employable to vehicles running on an actual road surface in an actual space. This vehicle brake-control system equips the vehicle with, as shown in FIG. 28, a GPS receiver 101, ROM 102, controller 103, and braking device 104. The ROM 102 priorly stores speed data and brake data per vehicle position (block) described in the first embodiment as reference data. As in the case with the game device, this reference data becomes the model data for braking upon driving along the objective travel route. The controller 103 receives position data from the GPS receiver 101 and provides to the braking device 104 orders of the auto-brake control in the aforementioned assist mode upon referring to this position data and the reference data corresponding thereto. Thereby, even in an actual vehicle, it is possible to provide assistance from the viewpoint of brake control during actual driving, and expected is considerable support especially to drivers who are not yet so experienced with driving. In such case, the aforementioned reference data may be stored in a storage medium such as a DVD or CD and it would be desirable, for example, to provide data for each objective travel route; such as for Route 4, or for Route 6, etc. Further, data stored as reference data is not limited to the combination of speed data and brake data per position, and, in order to suppress the amount of data, merely needed as minimum data is the curvature (R) data of the travel route. Accordingly, the controller may implement the auto-brake control for an actual vehicle by detecting the speed of the vehicle for each vehicle position, operating the maximum speed for cornering from the curvature of the curve, and ordering an appropriate brake control to the braking device in accordance with the operational speed.

As described above, according to the game device of the present invention, foremost, as a plurality of driving modes (moving mode of objects) set in conformity to the player's driving technique (moving technique of objects) are prepared, beginners to those advanced may enjoy the game on the same circuit (travel route). Particularly, in the assist mode among the aforementioned driving modes, as an auto-brake function is automatically obtained, this provides a preferable driving state for beginners.

Furthermore, as pertinent driving indications are provided based on reference data of experienced players, beginners to those fairly advanced may challenge a difficult game laying further emphasis on simulation, and the player's spirit in the game is provoked.

Moreover, traces such as skid marks of vehicles pursuant to the movement of objects can be displayed without having to steeply increase the memory capacity, and while maintaining high processing speed. Thus, it is possible to represent highly realistic pictures of moving objects or the state after movement matching the vehicle driving in an actual space, and provided is an image sharply increasing the simulation element.

In addition, the auto-brake function in the aforementioned assist mode can be employed to an actual vehicle running in an actual space and, therefore, provided is a pertinent driving state to drivers who are at a stage of still being inexperienced with driving.

We claim:

1. A game device for moving a vehicle along a traveling line in a virtual three-dimensional space pursuant to operations from a player and generating images of a driving state of such vehicle, comprising:

mode provision means for providing to the player a plurality of driving modes being selectably applicable to said vehicle and having mutually different driving characteristics of said vehicle upon moving said vehicle;

selection means for enabling said player to select a desired driving mode from said plurality of driving modes; and game execution means for executing a game relating to a movement of said vehicle in the desired driving mode selected by said player, wherein said plurality of driving modes includes a training mode having an indication function for indicating the driving state upon said player virtually driving said vehicle, wherein said indication function indicates to the player a brake timing by altering a display mode of said traveling line, and wherein said game execution means exhibits said indication function by including:

means for comparing successive blocks of speed data of reference data with a speed of said vehicle driven by said player and, when a comparative result shows that said speed data at a block of said reference data is greater than said speed of said vehicle, altering brake data of the block to zero as an alteration result so that said brake data is not applied when said vehicle reaches the block, and when the comparative result is not greater than said speed of said vehicle, not altering said brake data of the block as the alteration result, and means for altering the display mode of said traveling line pursuant to the alteration result.

2. A game device for moving a vehicle along a traveling line in a virtual three-dimensional space pursuant to operations from a player and generating images of a moving state of such vehicle, comprising:

storage means for pre-storing reference data representing movement of said vehicle in an ideal state traveling along said traveling line, wherein said reference data is driving data prepared from a driving state obtained from driving of a driver, who is experienced with an actual vehicle in an actual space, along a traveling route, said traveling line in said virtual three-dimensional space is a line simulating said traveling route in such actual space, and said driving data includes speed data, brake data and travel line data based on driving of the driver prepared along said traveling line and per block of a prescribed length;

operation means for showing the moving state of said vehicle based upon actual data received from said player actually moving said vehicle; and assist means for comparing said reference data and said actual data and automatically assisting the moving state of said vehicle to be moved by said player, wherein said assist means compares said reference data and actual data to obtain a comparison result and applies a braking assist algorithm to assist the player in braking the vehicle based upon the comparison result, said assist means includes:

means for obtaining a target acceleration from said speed data of said reference data of a block in front of a block on which said vehicle is positioned, and a speed of said vehicle driven by said player;

means for estimating a vehicle acceleration from the moving state of said vehicle;

means for comparing and judging said target acceleration and the vehicle acceleration estimated by said means for estimating;

means for judging an application of a brake is necessary when a comparative result from the means for comparing and judging shows that said target acceleration is greater than said estimated acceleration; and means for automatically assisting a control of a degree of acceleration when said means for judging an application of a brake judges that the application of the brake is not necessary, and assisting the control of the degree of acceleration and an amount of brake application when said judgment means judges that the application of the brake is necessary.

3. A game processing method for moving a vehicle along a traveling line in a virtual three-dimensional space pursuant to operations from a player and generating images of a driving state of such vehicle, comprising:

a mode provision step for providing to the player a plurality of driving modes being selectably applicable to said vehicle and having mutually different driving characteristics of said vehicle upon moving said vehicle;

a selection step for enabling the player to select a desired driving mode from said plurality of driving modes; and a game execution step for executing a game relating to the movement of said vehicle in the desired driving mode selected by said player, wherein said plurality of driving modes includes a training mode having an indication function for indicating the driving state upon said player virtually driving said vehicle, wherein said indication function indicates to the player a brake timing by altering a display mode of said traveling line, and wherein said game execution step exhibits said indication function by performing the following:

comparing successive blocks of speed data of reference data with a speed of said vehicle driven by said player and, when a comparative result shows that said speed data at a block of said reference data is greater than said speed of said vehicle, altering brake data of the block to zero as an alteration result so that the brake data is not applied when said vehicle reaches the block, and when the comparative result is not greater than said speed of said vehicle, not altering said brake data of the block as the alteration result, and altering the display mode of said traveling line pursuant to the alteration result.

4. A game processing method according to claim 3, wherein said plurality of driving modes includes an assist mode having an auto-brake function for automatically assisting the braking power of said vehicle.

5. A game processing method according to claim 3, wherein said indication function indicates to the player said driving state with, at least, either an image or a sound.

6. A game processing method according to claim 3, wherein said indication function is composed of at least one among:

a first indication function for indicating to the player a reference travel line by displaying this on said traveling line;

a second indication function for indicating to the player the existence of a curve on said traveling line; and a third indication function for indicating to the player a gearshift position at the curve on said traveling line.

7. A game processing method according to claim 3, wherein said game execution step executes said game by exhibiting said indication function by referring to an ideal reference data including speed data and brake data per block along said traveling line obtained from the driving of an experienced player.

8. A game processing method for moving a vehicle along a traveling line in a virtual three-dimensional space pursuant to operations from a player and generating images of a moving state of such vehicle, comprising:

a referencing step for pre-storing reference data representing the movement of said vehicle in an ideal state traveling along said traveling line, wherein said reference data is driving data prepared from the driving state obtained from the driving of a driver, who is experienced with an actual vehicle in an actual space, along a traveling route, said traveling line in said virtual three-dimensional space is a line simulating said traveling route in such actual space, and said driving data includes speed data, brake data and travel line data based on driving of the driver prepared along said traveling line and per block of a prescribed length;

an operating step for showing the moving state of said vehicle based upon actual data received from said player actually moving said vehicle; and an assist step for comparing said reference data and said actual data and automatically assisting the moving state of said vehicle to be moved by said player, wherein said assist step compares said reference data and said actual data to obtain a comparison result and applies a braking assist algorithm to assist the player in braking the vehicle based upon the comparison result, said assist step includes:

obtaining a target acceleration from said speed data of said reference data of a block in front of the block on which said vehicle is positioned, and the speed of said vehicle driven by said player;

estimating a vehicle acceleration from the moving state of said vehicle;

comparing and judging said target acceleration and the vehicle acceleration estimated by said means for estimating;

judging an application of a brake is necessary when a comparative result from the comparing and judging shows that said target acceleration is greater than said estimated acceleration; and automatically assisting the control of a degree of acceleration when said judging an application of a brake judges that the application of the brake is not necessary, and assisting the control of the degree of acceleration and an amount of brake application when said judging an application of a brake judges that the application of the brake is necessary.

9. A game processing method according to claim 8, further comprising:

a trace operation step for performing modeling conversion to traces pursuant to movement of said vehicle from a camera viewpoint and operating a conversion matrix thereof;

a storage step for storing said conversion matrix;

a trace judgment step for judging whether a display of said traces is necessary based on whether the trace is located within a field of view; and a display step for reading said conversion matrix stored by the storage step and displaying said conversion matrix when said judgment step judges that the display of said traces is necessary.

10. A game processing method according to claim 3, wherein said indication function includes:
- a judgment step for judging whether or not brake application is necessary based on a speed and position of said vehicle operated by said player;
- a calculation step for calculating a brake application timing based on the speed and position of said vehicle operated by said player when said judgment step judges that brake application is necessary; and
- a notification step for notifying said player of said brake application timing based on the brake timing calculated by said calculation step.

11. A game processing method according to claim 10, wherein said judgment step and calculation step respectively perform judgment and calculation based on the speed and position of said vehicle operated by said player, and the reference data corresponding to such position.

12. A game processing method according to claim 10, wherein said notification step notifies, earlier than usual, said brake application timing when the speed of said vehicle is fast in comparison to when the speed of said vehicle is slow.

13. A computer program product for moving a vehicle in a virtual three-dimensional space pursuant to operations from a player and generating images of a driving state of such vehicle, the computer program product comprising the following computer-readable program code for effecting actions in a computing platform:
- program code for providing to the player a plurality of driving modes being selectably applicable to said vehicle and having mutually different driving characteristics of said vehicle upon moving said vehicle;
- program code for enabling the player to select a desired driving mode from said plurality of driving modes; and
- program code for executing a game relating to a movement of said vehicle in the desired driving mode selected by said player,
- wherein said plurality of driving modes includes a training mode having an indication function for indicating the driving state upon said player virtually driving said vehicle, wherein said indication function indicates to the player a brake timing by altering a display mode of said traveling line, and
- wherein said program code for executing said game exhibits said indication function by including:
  - program code for comparing successive blocks of speed data of reference data with a speed of said vehicle driven by said player and, when a comparative result shows that said speed data at a block of said reference data is greater than said speed of vehicle, altering said brake data of the block to zero as an alteration result so that the brake data is not applied when said vehicle reaches the block, and when the comparative result is not greater than said speed of vehicle, not altering said brake data of the block as the alteration result, and
  - program code for altering the display mode of said traveling line pursuant to the alteration result.

14. A computer program product according to claim 13, wherein said plurality of driving modes includes an assist mode having an auto-brake function for automatically assisting the braking power of said vehicle.

15. A computer program product according to claim 13, wherein said indication function indicates to the player said driving state with, at least, either an image or a sound.

16. A computer program product according to claim 13, wherein said indication function is composed of at least one among:
- a first indication function for indicating to the player a reference travel line by displaying this on said traveling line;
- a second indication function for indicating to the player the existence of a curve on said traveling line; and
- a third indication function for indicating to the player a gearshift position at the curve on said traveling line.

17. A computer program product according to claim 13, wherein said program code for executing a game executes said game by exhibiting said indication function by referring to an ideal reference data including speed data and brake data per block along said traveling line obtained from the driving of an experienced player.

18. A computer program product according to claim 13, wherein said indication function includes:
- program code for judging whether or not brake application is necessary based on a speed and position of said vehicle operated by said player;
- program code for calculating a brake application timing based on the speed and position of said vehicle operated by said player when said judgment step judges that brake application is necessary; and
- program code for notifying said player of said brake application timing based on the brake timing calculated by said program code for calculating.

19. A computer program product according to claim 18, wherein said program code for judging and said program code for calculating respectively perform judgment and calculation based on the speed and position of said vehicle operated by said player, and the reference data corresponding to such position.

20. A computer program product according to claim 18, wherein said program code for notifying notifies, earlier than usual, said brake application timing when the speed of said vehicle is fast in comparison to when the speed of said vehicle is slow.

21. A computer program product for moving an object in a virtual three-dimensional space pursuant to operations from a player and generating images of a moving state of such object, the computer program product comprising the following computer-readable program code for effecting actions in a computing platform:
- program code for referencing pre-stored reference data representing movement of said vehicle in an ideal state traveling along said traveling line,
- wherein said reference data is driving data prepared from a driving state obtained from driving of a driver, who is experienced with an actual vehicle in an actual space, along a traveling route, said traveling line in said virtual three-dimensional space is a line simulating said traveling route in such actual space, and said driving data includes speed data, brake data and travel line data based on the driving of the driver prepared along said traveling line and per block of a prescribed length;
- program code for showing the moving state of said vehicle based upon actual data received from said player actually moving said vehicle; and
- program code for comparing said reference data and said actual data and automatically assisting the moving state of said vehicle to be moved by said player,
- wherein said program code for comparing compares said reference data and actual data to obtain a comparison result and applies a braking assist algorithm to assist the player in braking the vehicle based upon the comparison result, wherein said program code for comparing further includes:

program code for obtaining a target acceleration from said speed data of said reference data of a block in front of a block on which said vehicle is positioned, and a speed of said vehicle driven by said player;

program code for estimating a vehicle acceleration from the mvoing state of said vehicle;

program code for comparing and judging said target acceleration and the vehicle acceleration estimated by said means for estimating;

program code for judging an application of a brake is necessary when a comparative result from the means for comparing and judging shows that said target acceleration is greater than said estimated acceleration; and program code for automatically assisting the control of a degree of acceleration when said means for judging the application of the brake judges that the application of the brake is not necessary, and assisting the control of the degree of acceleration and an amount of brake application when said judgment means judges that the application of the brake is necessary.

22. A computer program product according to claim 21, further comprising:

program code for performing modeling conversion to traces pursuant to movement of said object from a camera viewpoint and operating a conversion matrix thereof;

program code for storing said conversion matrix;

program code for judging whether a display of said traces is necessary based on whether the trace is located within a field of view; and program code for reading said conversion matrix stored by the storage step and displaying said conversion matrix when said judgment step judges that the display of said traces is necessary.

* * * * *